(12) United States Patent
Guttinger et al.

(10) Patent No.: US 7,726,096 B2
(45) Date of Patent: Jun. 1, 2010

(54) CONTINUOUS LOADING SYSTEM

(75) Inventors: Peter Guttinger, Milton (CA); Berger Bernd Pogrzeba, Georgetown (CA); Tony Spadafora, Ancaster (CA); Tomasz Kardynal, Mississauga (CA)

(73) Assignee: Langen Packaging Inc., Mississauga, Ontario (CA)

( * ) Notice: Subject to any disclaimer, the term of this patent is extended or adjusted under 35 U.S.C. 154(b) by 0 days.

(21) Appl. No.: 12/232,546

(22) Filed: Sep. 18, 2008

(65) Prior Publication Data

US 2009/0133363 A1 May 28, 2009

Related U.S. Application Data

(63) Continuation of application No. 11/514,998, filed on Sep. 5, 2006, now abandoned.

(51) Int. Cl.
*B65B 5/00* (2006.01)
(52) U.S. Cl. .................. 53/251; 53/252; 198/867.11; 198/867.13
(58) Field of Classification Search ............ 53/52, 53/251–253, 259, 473; 198/867.11, 867.13, 198/803.1, 803.13
See application file for complete search history.

(56) References Cited

U.S. PATENT DOCUMENTS

| 3,633,739 | A | 1/1972 | Renner et al. |
|---|---|---|---|
| 4,523,671 | A | 6/1985 | Campbell |
| 4,664,248 | A | 5/1987 | Goodman, Jr. et al. |
| 5,014,501 | A * | 5/1991 | Constantin et al. ............ 53/173 |
| 6,170,634 | B1 * | 1/2001 | Jaquet ..................... 198/347.1 |
| 6,209,708 | B1 | 4/2001 | Philipp et al. |
| 6,293,387 | B1 | 9/2001 | Forster |
| 6,374,997 | B1 | 4/2002 | Spadafora et al. |
| 6,382,397 | B2 * | 5/2002 | Maeder ................... 198/465.4 |
| 6,390,276 | B1 * | 5/2002 | Haug et al. ............ 198/377.01 |
| 6,499,274 | B1 * | 12/2002 | McDonald et al. ............ 53/434 |
| 6,814,533 | B1 | 11/2004 | Prud'Homme et al. |

* cited by examiner

*Primary Examiner*—Thanh K Truong

(57) ABSTRACT

A system is disclosed for loading a plurality of items into a plurality of containers. The system may include a plurality of pucks, each puck adapted to retain an item. A puck delivery sub-system may include a puck-infeed conveyor to move each of the pucks along an in-feed conveyor path, and a transition apparatus operable to facilitate the transition of the pucks to a continuous puck unloading conveyor. The puck un-loading conveyor may have a releasable engagement mechanism such that when each of the pucks is engaged with said puck unloading conveyor, each of said pucks is fixed in a relative longitudinal position relative to the puck unloading conveyor. An item transfer apparatus may transfer an item from each puck when engaged with the puck un-loading conveyor, to a corresponding container.

22 Claims, 21 Drawing Sheets

CONTINUOUS LOADING SYSTEM

RELATED APPLICATIONS

This is a continuation application of application Ser. No. 11/514,998 filed Sep. 5, 2006, now abandoned the entire contents of which are hereby incorporated herein by reference.

FIELD OF THE INVENTION

The present invention relates generally to the continuous loading of containers with items.

BACKGROUND OF THE INVENTION

Systems and methods for loading containers such as for example cartons, with items, are well known. It is desirable in the packaging of items to have systems which load such cartons with items at a high rate. To achieve a relatively high loading rate, it is preferable to employ systems which load the items in the containers in continuous movement, rather than systems which bring both the container and item to a stopped position to carry out the item loading function.

Systems are known that employ container conveyors (e.g. carton conveyors) which carry a series of cartons along a conveyor path. A bucket conveyor also moves a plurality of items in buckets along a path that runs parallel and adjacent to the carton conveyor. Transfer devices, such as barrel loaders, move the items from the buckets in the bucket conveyor into the cartons held on the carton conveyor, while both the carton conveyor and the bucket conveyor are moving in the same general direction. Once the item transfer has been made, the carton filled with the one or more items can be taken to another station for further processing.

One of the drawbacks of such systems is that the buckets on the bucket conveyor are fixedly attached to the bucket conveyor. This is required to ensure proper alignment between the bucket carrying the item and the carton carried on the carton conveyor. However, since the buckets typically need to be filled while the bucket is moving, this poses some difficulties. Hesitating bucket conveyor systems are known such as U.S. Pat. No. 5,226,524 owned by Langen Packaging Inc. While these do permit the bucket to be loaded while at a stationary position, these systems require relatively more complex bucket conveyor design and also the speed at which items can be unloaded is reduced.

Accordingly, improved systems and methods for continuously loading cartons with items are desired.

SUMMARY OF THE INVENTION

According to one aspect of the invention, there is provided a system for loading a plurality of items into a plurality of containers comprising: (a) a plurality of pucks, each of the pucks adapted to retain an item; (b) a puck delivery system comprising a puck-infeed conveyor operable to move each of the plurality of pucks in series along an in-feed conveyor path portion, and a transition apparatus operable to facilitate the transition of the plurality of pucks from the puck in-feed conveyor to a continuous puck unloading conveyor; (c) a continuous puck unloading conveyor movable in a longitudinal direction along a first conveyor path portion, the pucks and the puck unloading conveyor having a releasable engagement mechanism operable to facilitate the pucks releasably engaging the puck unloading conveyor, such that when each of the pucks is engaged with the puck unloading conveyor, each of the pucks is fixed in a relative longitudinal position relative to the puck unloading conveyor; (d) a container conveyor for moving a plurality of containers in series with fixed longitudinal positions relative to the container loading conveyor, and the container loading conveyor moving in a longitudinal direction along a second conveyor path portion proximate the first path portion of the puck unloading conveyor; (e) an item transfer apparatus for transferring the item from each of the plurality of pucks on the puck unloading conveyor to a corresponding container being moved on the container conveyor; wherein the item transfer apparatus will transfer each item retained by pucks once engaged with the puck unloading conveyor, to a respective container of the container conveyor, while the puck unloading conveyor is moving along the first path portion and the container conveyor is moving along the second path portion, wherein after each item retained by the puck has been transferred to a carton, the releasable engagement mechanism is operable to facilitate the pucks being released from engagement with the puck unloading conveyor.

According to another aspect of the invention, there is provided a system for loading a plurality of items into a plurality of containers comprising: (a) a plurality of pucks, each of the pucks adapted to retain an item; (b) a puck delivery system operable to deliver the plurality of pucks in series to a puck unloading conveyor; (c) the continuous puck unloading conveyor movable in a longitudinal direction along a first conveyor path; (d) the pucks and the puck unloading conveyor having a releasable engagement mechanism operable to provide the pucks with a releasable connection to the puck unloading conveyor, such that when the pucks are connected to the puck unloading conveyor, each of the plurality of pucks is fixed in a relative longitudinal position relative to the puck unloading conveyor; (e) a continuous container loading conveyor for moving a plurality of containers in series with fixed longitudinal positions relative to the container loading conveyor, and the container loading conveyor moving in a longitudinal direction along a second conveyor path having a path portion proximate a path portion of the path of the puck unloading conveyor; (f) an item transfer apparatus for transferring each the item from each of the plurality of pucks on the puck unloading conveyor to a corresponding container being moved on the container conveyor; the puck delivery system operable to move the plurality of pucks in series to the puck unloading conveyor to cause each of the pucks to connect with the puck unloading conveyor with the releasable engagement mechanism; wherein when the puck unloading conveyor moves the pucks along the path portion of the first path while the pucks are releasably connected to the puck unloading conveyor, the item transfer apparatus will transfer each item retained by each the puck to a respective container on the container conveyor while respective containers are moving along the path portion of the second conveyor path; wherein after each item retained by the puck has been transferred to a carton, the releasable engagement mechanism is operable to facilitate the pucks being released from engagement with the puck unloading conveyor.

According to a further aspect of the invention, there is provided a system for loading items into a plurality of containers comprising: (a) a first puck conveyor for moving a plurality of pucks, each of the pucks retaining an item, along a first longitudinal path with a frictional force exerted on the pucks in a first longitudinal path by the conveyor; (b) a second continuous puck conveyor for moving the plurality of pucks along a second longitudinal path in series while each of the pucks is in a fixed longitudinal connection with the second continuous conveyor; (c) an apparatus for facilitating the transition of each of the plurality of pucks from the first conveyor to the second conveyor; (d) a container conveyor moving a plurality of containers in series with fixed longitudinal positions relative to the container conveyor along a third longitudinal path; (e) the second continuous conveyor having a first path portion of the first path proximate a path portion of the second path of the container conveyor; wherein while the pucks are moving along the path portion of the second longitudinal path and the containers are moving along the path portion of the third longitudinal path, transferring each item retained by the puck to a respective container.

According to a still further aspect of the invention, there is provided a method for loading items into a plurality of containers comprising: (a) moving a plurality of pucks, each of the pucks retaining an item, along a first path with a frictional force exerted on the pucks in a first longitudinal path; (b) facilitating the transition of the plurality of pucks in series into fixed longitudinal engagement with a continuous puck moving apparatus; (c) moving the pucks in series along a second longitudinal path while in the fixed longitudinal engagement with the continuous puck moving apparatus; (d) moving a plurality of containers in series with fixed longitudinal positions relative to a container moving apparatus, and along a third longitudinal path having a path portion proximate a path portion of the second longitudinal path; (e) while the pucks are moving along the path portion of the second longitudinal path and the containers are moving along the path portion of the third longitudinal path, transferring each item retained by the puck to a respective container.

According to another aspect of the invention, there is provided a system for loading a plurality of items into a plurality of containers from a plurality of pucks, each of the pucks adapted to retain an item, the method comprising: (a) an apparatus operable to move each of the plurality of pucks in series along a puck in-feed conveyor path portion in a longitudinal direction with a frictional force imparted on each of the pucks; (b) an apparatus operable to facilitate the transition of the plurality of pucks from the puck in-feed conveyor to engage a continuous puck unloading conveyor; (c) an apparatus operable to move the pucks on the continuous puck unloading conveyor in a longitudinal direction along a first path portion wherein each of the pucks is fixed in a relative longitudinal position relative to the puck unloading conveyor; (d) an apparatus for moving a plurality of containers in series with fixed longitudinal position relative to the puck unloading conveyor, and in a longitudinal direction along a second conveyor path portion proximate the first path portion of the puck unloading conveyor; an apparatus for transferring each the item from each of the plurality of pucks on the puck to a corresponding container.

According to another aspect of the invention, there is provided a puck for retaining an item comprising: (a) a body; (b) a receptacle formed in the body for retaining an item; (c) at least one cam follower extending from the body, the cam follower having a flange spaced from the body to provide a slot configured to receive a cam track portion therein.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
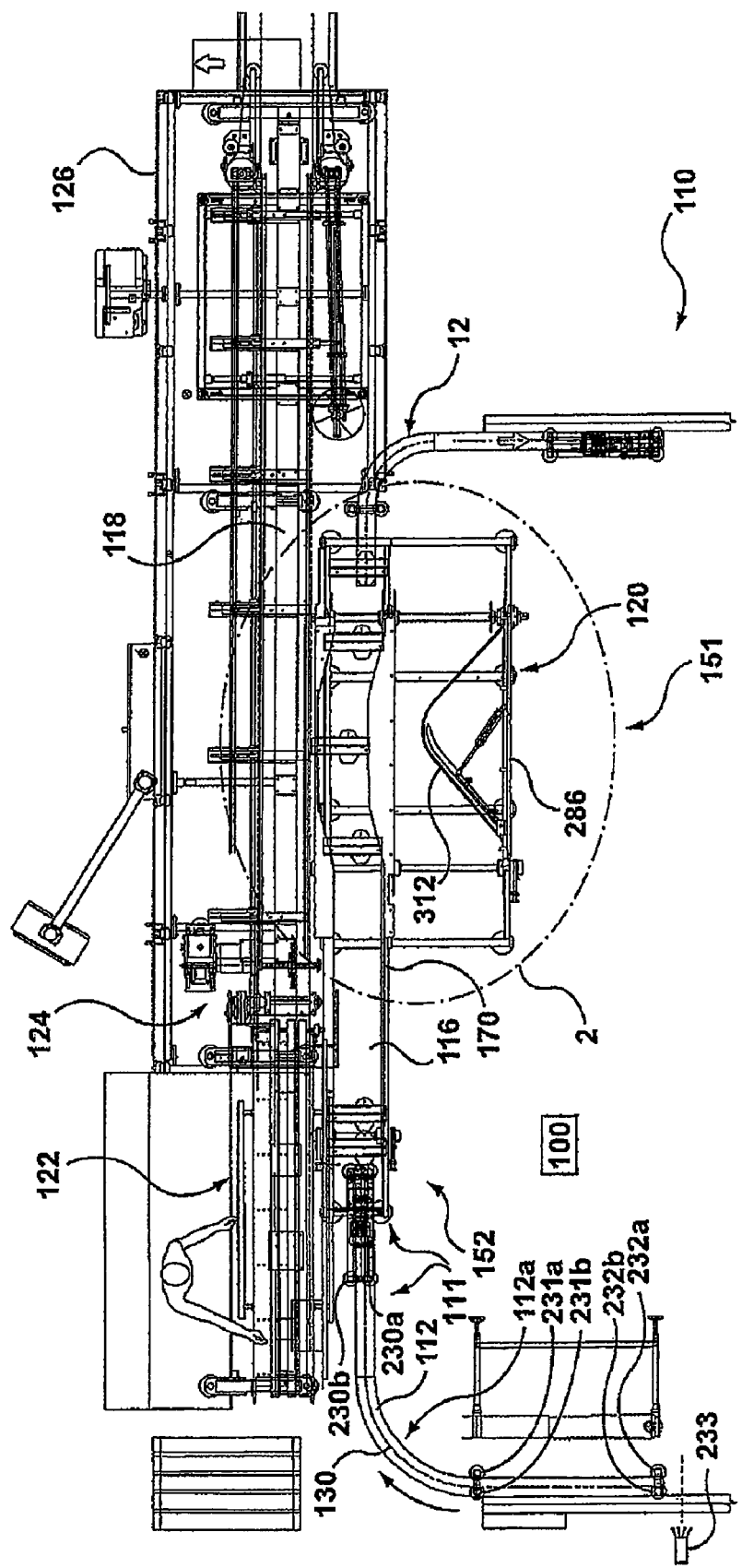
FIG. 1 is a plan view of continuous item loading system, with some components omitted for clarity.
Figure 2:
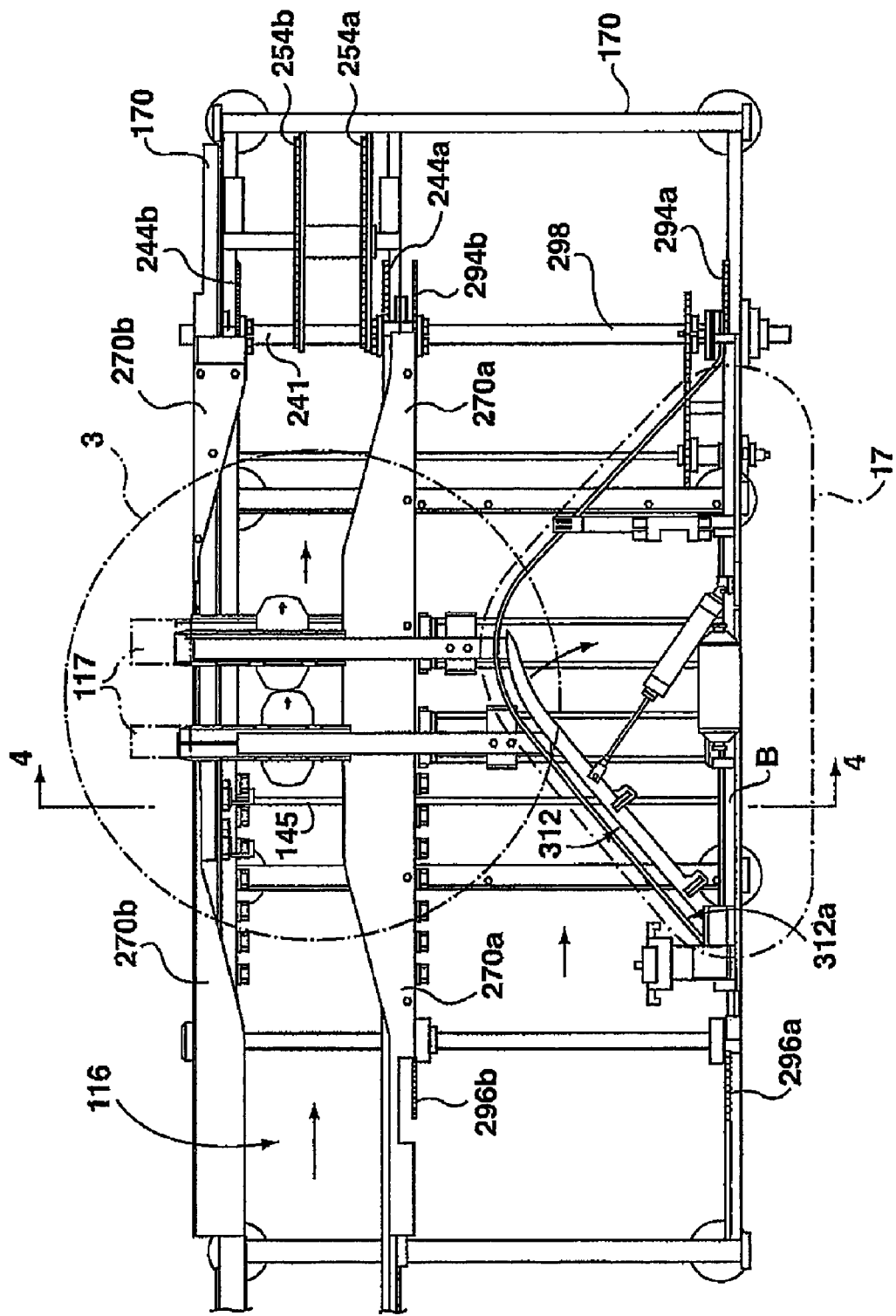
FIG. 2 is an enlarged view of the part of the system in FIG. 1, marked as 2 in FIG. 1.

With reference initially to FIGS. 1 and 2, and by way of overview, a continuous carton loading system 110 is illustrated. The components of system 110 may include a puck delivery sub-system 111 that may include a puck in-feed conveyor 112, a plurality of puck clamping devices, 229a, 229b; 230a, 230b; 231a, 231b, and 232a, 232b (generally designated 230). Puck delivery sub-system 111 may also include a puck transition apparatus 174. In addition to puck delivery sub-system 111, carton loading system 110 may also include a puck unloading conveyor 116, a carton conveyor 118 and an item transfer apparatus 120. System 110 may also include a carton magazine 122, a carton feeder 124 and an item confinement apparatus (not shown in FIG. 1 or FIG. 2). A Programmable Logic Controller (PLC 100) may control the overall operation of the components of system 110.

Carton loading system 110 may also include a carton conveyor frame 126 and a puck conveyor frame 170. System 110 may use pucks 132 to carry items 150 (shown only in FIG. 5 for simplicity) to an item transfer and puck unloading/carton loading station 151 (FIG. 1) where items 150 can be transferred from pucks 132 to cartons 117 (not shown in FIG. 1). The use of pucks 132 may provide significant benefits and flexibility to the overall packaging system of which the carton loading system 110 may only be a part. For example, the use of pucks 132 may provide for greater flexibility in the loading of items 150 to be carried to the carton loading station 151.

Figure 13:
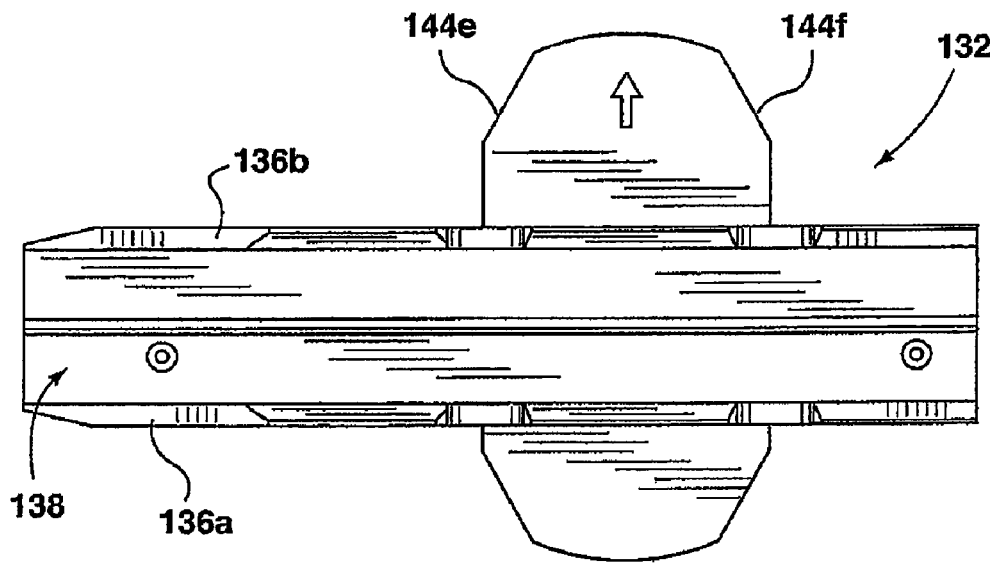
FIG. 13 is a top plan view of a puck that may be used in the system of FIG. 1.
Figure 14:
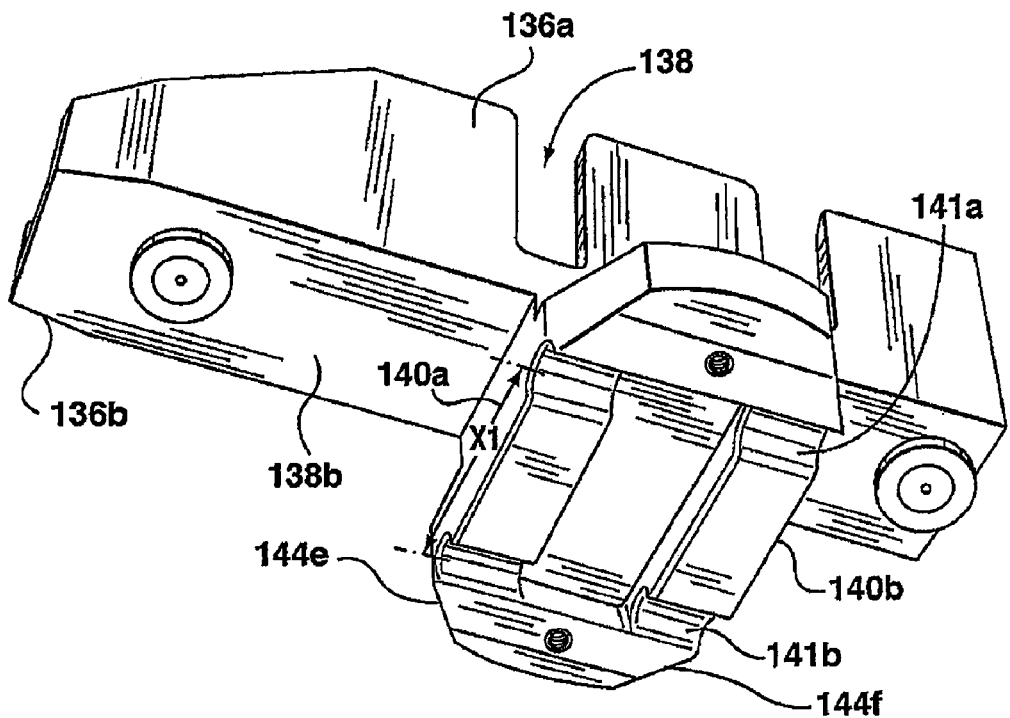
FIG. 14 is a bottom perspective view of the puck of FIG. 13.
Figure 15:
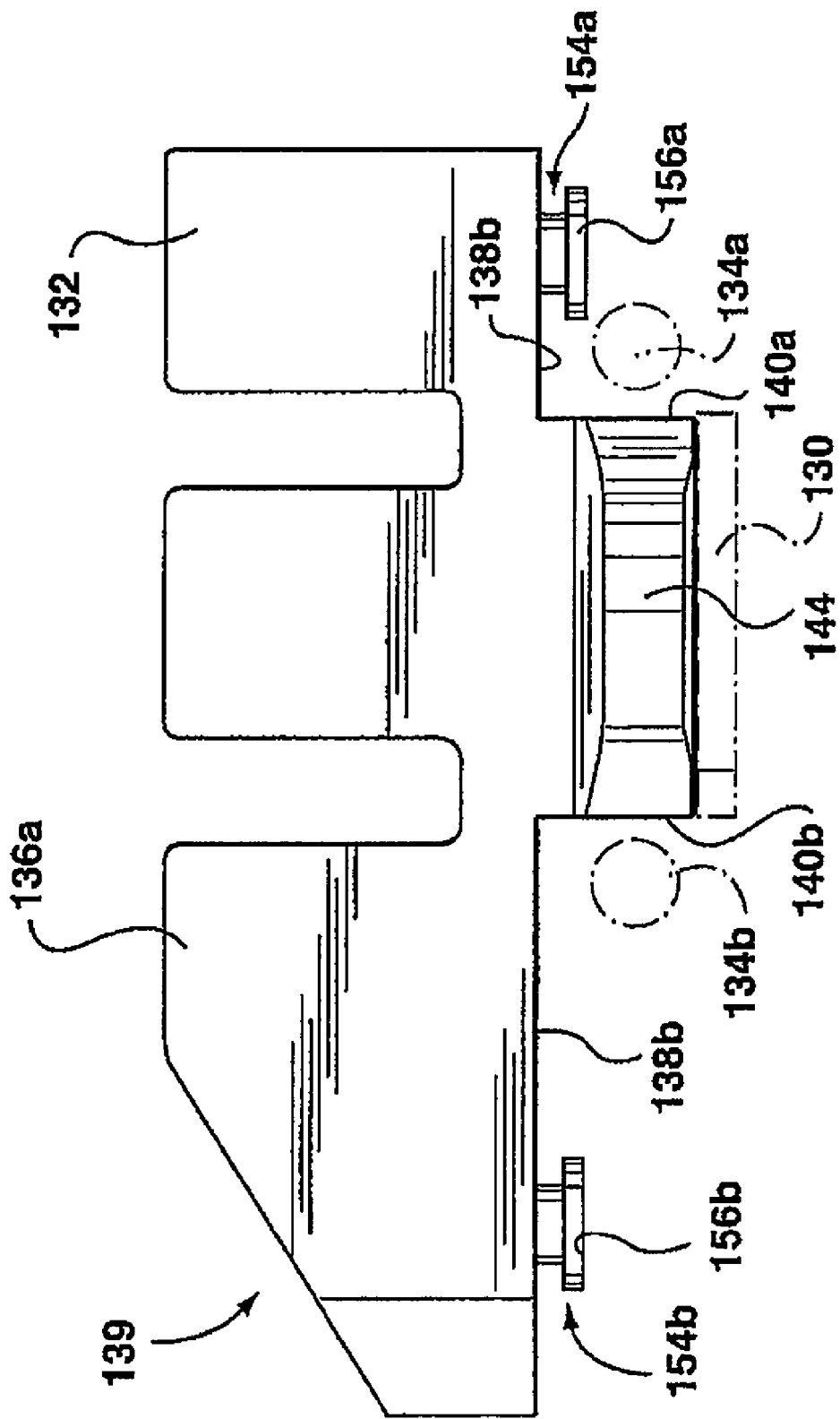
FIG. 15 is an elevation view of the puck of FIGS. 13 and 14 with a puck free movement conveyor shown in broken outline.

As shown in FIGS. 13, 14 and 15, pucks 132 may be configured in many different ways such that they may be moved as a result of a frictional force imparted upon the puck by a moving surface of a moving apparatus contacting a surface of the puck. By way of example only, pucks 132 may each have a base 144 to which is mounted or integrally connected, an item receptacle portion generally designated 139. Item receptacle 139 may have a base 138 and two transversely oriented side walls 136a, 136b, and may thus hold therein one or more items 150 which are to be loaded into a carton 117 (FIG. 2). Pucks 132 may be made from any one or more suitable materials. For example, the receptacle portion 139 and base 144 may be integrally formed of a suitable hard plastic or any other suitable material.

Depending from a downward facing surface 138b of receptacle portion 139 may be mounted transversely opposed cam followers 154a, 154b. Cam followers 154a, 154b may be configured to engage the edge of adjacent cam plates as is described hereinafter. Cam followers 154a, 154b may each have lower flanges 156a, 156b which assist in maintaining the stability of the pucks 132 as they move through the system, particularly during the item loading process at station 151, as described hereinafter.

With reference to both FIGS. 1 and 15, puck in-feed conveyor 112 of puck delivery sub-system 111 may comprise a conveyor having a belt 130 which may be driven with intermittent or continuous movement, and opposed side rails 134a, 134b. Pucks 132 may rest directly upon a belt 130 and be generally carried around the path of puck in-feed conveyor 112 by belt 130 while being guided by rails 134a, 134b, engaging side walls 140a, 140b of puck base portion 144. Belt 130 can be formed as a flexible conveyor belt, which enables belt 130 to readily negotiate corners or curves in the path of in-feed conveyor 112.

Puck in-feed conveyor 112 can generally be formed of an aluminum-extruded beam construction, with low friction slide rails guiding a plastic multi-flexing belt 130. Flexible link conveyor systems suitable for deployment as conveyor system 112 include the Flex Link conveyors made by SKF or FlexLink AB. Belt 130 may be driven by a drive motor that may be controlled by PLC 100. Belt 130 may also be driven continuously by a drive motor that can also be provided as part of the conveyor system made by a supplier such as SKF or FlexLink AB Belt 130 may have an upper surface that co-operates with lower surface 138b of base portions 144 of pucks 132, to provide sufficient frictional engagement between belt 130 and base 144 of the puck members 132 to move the pucks 132 along the conveyor path when the pucks are not obstructed. Pucks 132 in series on belt 130 can, however, vary their longitudinal position on the path in relation to each other when a force is exerted on a puck in the opposite direction to the movement of belt 130 that overrides the frictional engagement force between the puck(s) and the belt. In such circumstances, belt 130 may slide relative to lower surface 138b of pucks 132.

Belt 130 may be supported and guided in part by horizontally oriented idler sprockets, which in the illustrated embodiment may be disposed at curved portion 112a (FIG. 1) to assist in providing a partially curved conveyor path for in-feed conveyor 112. The idler sprockets may have an upward facing surface, which frictionally engages the underside of belt 130 and so rotate with the movement of belt 130. Belt 130 may have a cross section shaped like a horizontal H so idler sprockets fit in between the top horizontal and the bottom horizontal portions and can guide belt 130 from both above and below.

Puck in-feed conveyor 112 may also be part of a larger puck loading system which has located upstream one or more item loading stations (not shown) where items 150 can be loaded into the pucks 132 using known types of loading apparatus. Item loaders could be provided to load any kind of items into pucks such as by way of example only, rolls of plastic bags. Pucks 132 may be easily delivered to in-feed conveyor 112 from multiple in-feed channels thereby providing greater flexibility in feeding pucks 132 onto puck in-feed conveyor 112.

With reference now to FIGS. 1, 5, 6, 7 and 8a, the components of system 110 at puck transition station 152 are shown in detail, including puck transition apparatus 174. In general, puck in-feed conveyor 112 delivers pucks 132 on belt 130 to transition station 152. Transition station 152 may perform the function of accumulating a plurality of pucks 132 into a group generally designated 155. The group may have a pre-determined minimum number, that once reached, will result in the commencement of the transfer of pucks from infeed conveyor 112 to puck unloading conveyor 116. Apparatus 174 may then facilitate the transition of the lead puck 132 in the group onto puck unloading conveyor 116 whereby the entire group may be transitioned into engagement with the puck un-loading conveyor 116. By providing appropriate timing of the lead puck 132 of group 155, and if for the remaining pucks in the group of pucks 132, contact is maintained with adjacent pucks, at least until each puck engages with the puck unloading conveyor 116, all pucks in the group will also be appropriately timed for engagement with puck unloading conveyor 116 and make the transition from in-feed conveyor 112. The number of pucks 132 in any specific group 155 may be indefinite, and the number of pucks in different groups may vary. Pucks 132 may continue to accumulate as part of the group 155 and be continually delivered to puck unloading conveyor 116, until a discontinuity or interruption in supply occurs such that a gap is formed between at least one pair of adjacent pucks. An illustrated group in FIG. 8a comprises six pucks, all of which become synchronized with puck unloading conveyor 116.

If there is an un-interrupted supply of pucks 132 provided by in-feed conveyor 112, so that there is no gap between any adjacent pucks 132 being moved through transition station 152, then pucks 132 may continue to be automatically pushed into synchronized engagement by the movement of in-feed conveyor 112 (which moves at least as fast, and preferably faster, than conveyor 116) and the length of the group of pucks will continue to accumulate. If however, a gap between a pair of adjacent pucks 132 is detected prior to delivery to the puck unloading conveyor 116, transition apparatus 174 will be activated again to terminate the continuation in supply of pucks to the first group. Transition apparatus 174 will then be located so as to identify a new lead puck 132 and the next group of pucks will start to be accumulated until again a pre-determined minimum number of pucks is accumulated.

Figure 5:
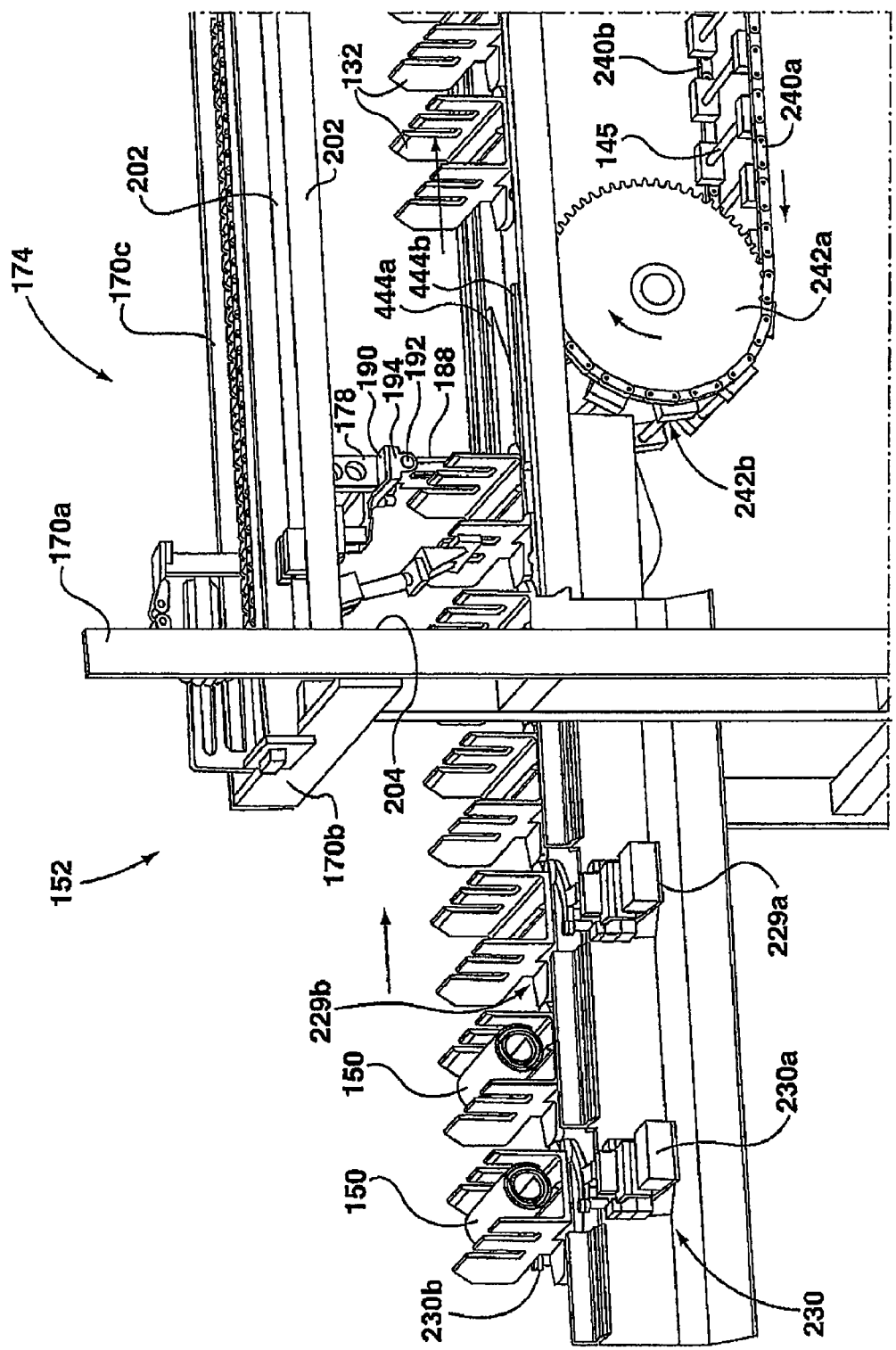
FIGS. 5, 5A and 5B are different perspective views of part of the system of FIG. 1.
Figure 5A:
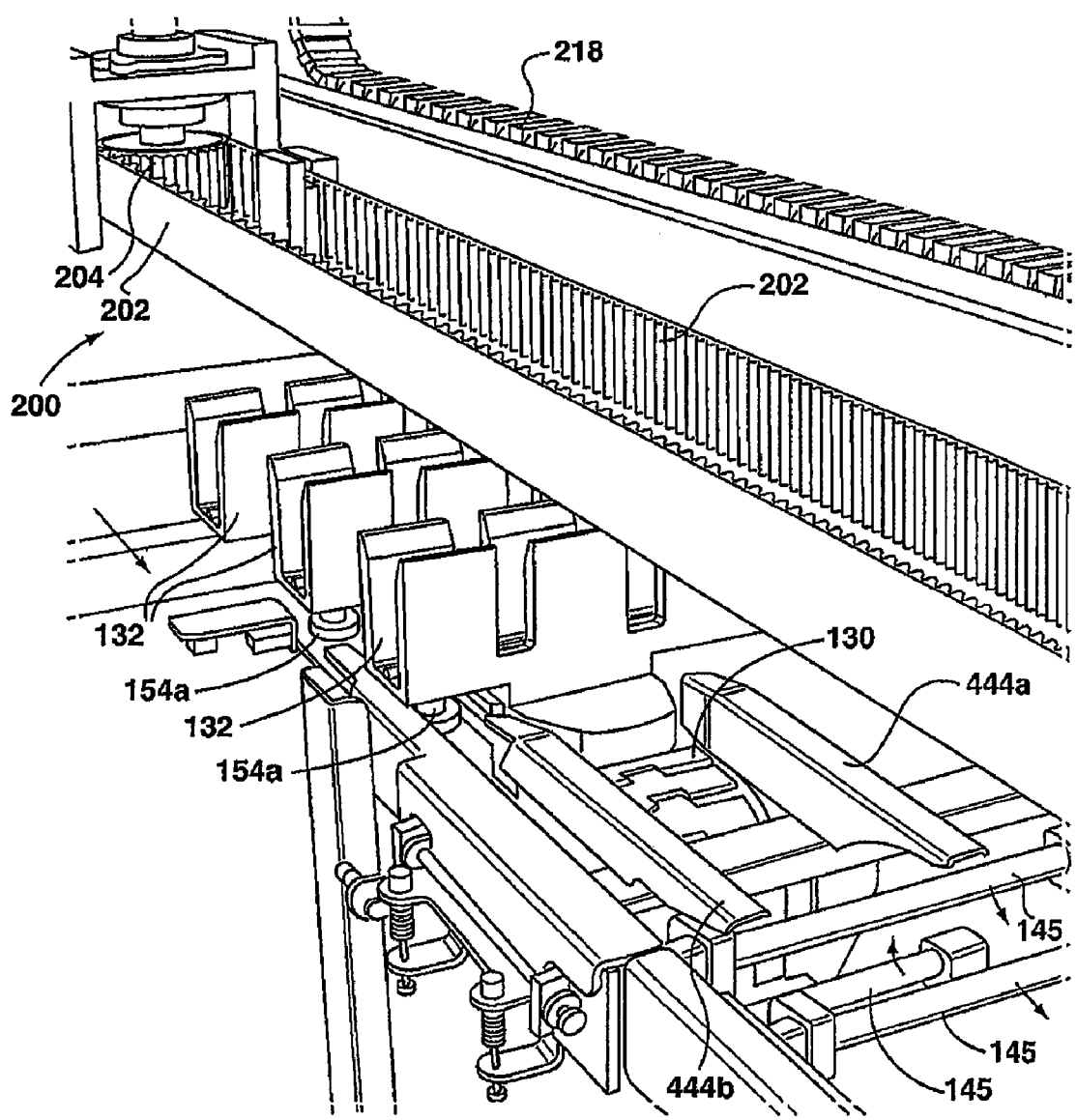

As illustrated for example in FIGS. 5 and 5a, longitudinally aligned with the end of belt 130 may be a pair of spaced, longitudinally oriented rail members 444a, 444b. Rail members 444a, 444b may assist in guiding pucks 132 in making the transition from in-feed conveyor 112 to puck unloading conveyor 116. Rails 444a, 444b may be made of any suitable material including a hard plastic, a metal such as steel or aluminum, or any other suitable material. The upper surfaces of rails 444a, 444b, may be configure to engage the lower surfaces 138b of the receptacle base 138 and thus may support pucks 132 as they pass from belt 130 to be engaged by cross bars or rods 145 of puck unloading conveyor 116. Rails 444a, 444b may also be part of a system overload feature. For example, the rails 444a, 444b may be mounted for upward pivoting movement about a pivot location with pivoting movement being effected by, for example, pneumatic cylinders with interconnected pivot arms (not shown). In the event that a puck 132 does not properly engage with rods 145 in the manner shown, for example in FIG. 9, an optical sensor located proximate the rod engagement location may detect the same and send a signal to PLC 100. PLC 100 can then, in addition to shutting down conveyors 112 and 116 (which may take a short amount of time before they stop moving), also cause rails 444a, 444b to elevate, thus reducing the risk of pucks damaging one or more other parts of the system 110.

Puck transition apparatus 174 may be mounted to part of the frame generally designated 170. Frame 170 may have vertical members 170a, one or more transverse members 170b and one or more longitudinal members 170c in the vicinity of puck transition apparatus 174. Mounted and supported by frame 170 is a longitudinally oriented track 172. Puck transition apparatus 174 may have a slide plate 176 that may slide backwards and forwards on track 172 in a longitudinal direction. Depending vertically downward toward from a rearward end of slide plate 176 may be a plate 178. Mounted transversely and horizontally to the end of plate 178 may be a support block 190. At each end of support block 190 may be a housing 194, each housing having a transversely oriented aperture. Each aperture supports an end of a transversely mounted shaft 192, allowing rotation of the shaft about its longitudinal axis. The aperture in each housings 194 may be provided with a bushing or bearing to permit shaft 192 to easily rotate about its longitudinal shaft axis.

Depending from, and fixed for rotation with, shaft 192 is a holding member 188 that may be shaped like a paddle. Holding member 188 may rotate clockwise and anti-clockwise between a generally downward 6 o'clock position shown for example in FIG. 8a, and a "9 o'clock" position shown for example in FIG. 8c.

Shaft 192 may have attached proximate one end thereof, a crank arm 184 that may be interconnected proximate an end of a piston arm 184 of a double acting pneumatic cylinder 180. The rear end of cylinder 180 may be attached to the sliding plate 176. Extension and retraction of piston arm 182 may cause crank arm 184 to rotate, thus rotating holding member 188 between the positions shown in FIGS. 8a and 8c. The operation of pneumatic cylinder 180 may be controlled by PLC 100 in conjunction with electronic valves. Thus, holding member 188 can be used to engage the leading wall 136b of item receptacle 139 of a leading puck 132 of a group of pucks located at transition station 152.

Figure 5B:
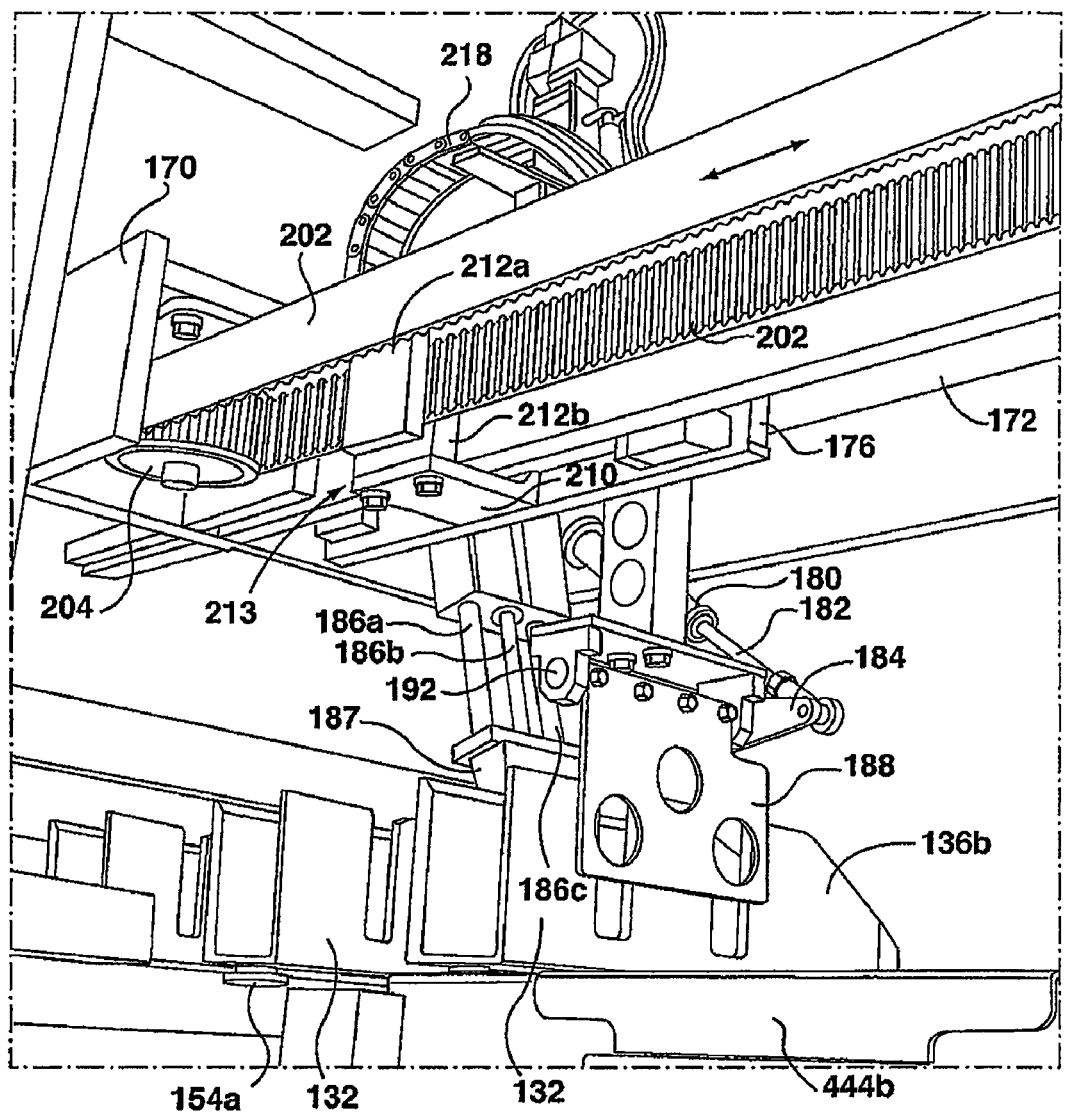
Figure 6:
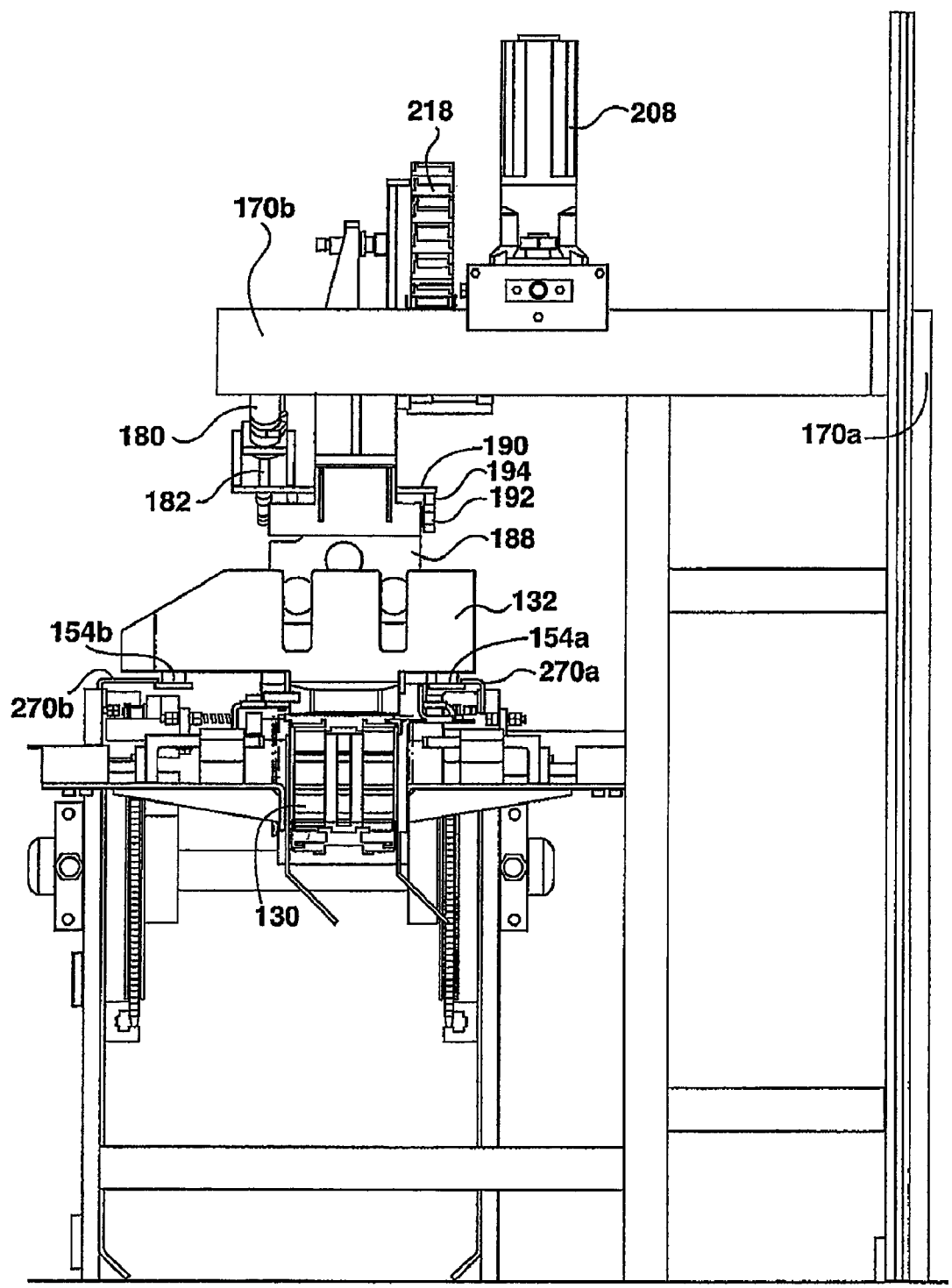
FIG. 6 is a cross sectional, elevation view at a transverse plane through line 6 in FIG. 5.

A puck rear wall engagement member 187 is affixed to the end of reciprocating arms 186a-c (FIG. 5b). One or more of arms 186a-c may be a piston arm of a respective double acting pneumatic cylinder housed in a mounting block 198. Arms 186a-c may be reciprocally moved axially in and out of block 198. Mounting block 198 may be mounted to sliding plate 176. Arms 186a-c reciprocate to move the engagement member 187 between the extended position shown in FIG. 8a and the retracted position shown in FIG. 8c. The operation of pneumatic double acting cylinders in block 198 may also be controlled by PLC 100 in conjunction with electronic valves. Thus, rear wall engagement member 187 can be used to engage the trailing wall 136a of item receptacle 139 of a leading puck 132 of a group of pucks located at transition station 152.

Compressed air can be supplied to the pneumatic cylinders from a source by piping (not shown) that is housed inside an extendible and retractable hose device 218 (known as a flexible wire/hose track device). Device 218 will move with transition apparatus 174 thus continuing to supply electrical power/signals and compressed air to transition apparatus 174.

Puck transition apparatus 174 can thus move along track 172 and in doing so move the leading puck 132 of a group of pucks with it, to move the leading puck over the rails 444a, 444b in such a manner as to engage with cross rods 145 of puck unloading conveyor 116.

A drive apparatus 200 is provided for moving puck transition apparatus 174 in reciprocating movement forward and backward along track 172. Drive apparatus 200 may include a vertically oriented endless drive belt 202 supported at one end by an idler 204 and at the other end by a drive wheel 206. Drive wheel 206 may be powered by a drive shaft of a servomotor 208 which can rotate drive wheel 206 in both directions. Idler 204, drive wheel 206 and motor 208 may be supported and mounted on frame 170. Thus rotating drive wheel 206 will move belt 202 in a direction corresponding to the direction of rotation of drive wheel 206.

A resolver/encoder (not shown) may be associated with the drive shaft of motor 208. In this way, rotation of the drive shaft of motor 208 can be associated with a location on belt 202. In particular, since the puck transition apparatus 174 may be directly interconnected to belt 202, the longitudinal position of belt 202 can be provided to PLC 100 by way of the signals provided by the resolver associated with motor 208. However, a separate resolver/encoder associated with drive motor 208 may not be necessary. Once puck transition apparatus 174 is properly positioned, the operation of drive motor 208 could be tied directly with a resolver/encoder associated with the drive shaft 241 and/or drive motor of puck un-loading conveyor 116. Thus, the drive motor 208 may be controlled by PLC 100 so that transition apparatus 174 is driven until a lead puck is synchronized with a pair of rods 145 of puck unloading conveyor 116.

Belt 202 is interconnected to puck transition apparatus 174 by a clamp 213 having vertically oriented and interconnected clamp arms 212a, 212b. Clamp arms 212a, 212b are positioned on opposite sides of belt 202 and sandwich belt 202 between the arms 212a, 212b. Clamp 213 may be adjustable so that the longitudinal position of the clamp 213 on belt 130 may varied. Mounted to the bottom of clamp arm 212b is a transversely extending plate 210 which is interconnected to a rear surface of sliding plate 176. When belt 202 moves longitudinally, side plate 176 may be driven along track 172, in either direction.

Figure 7:
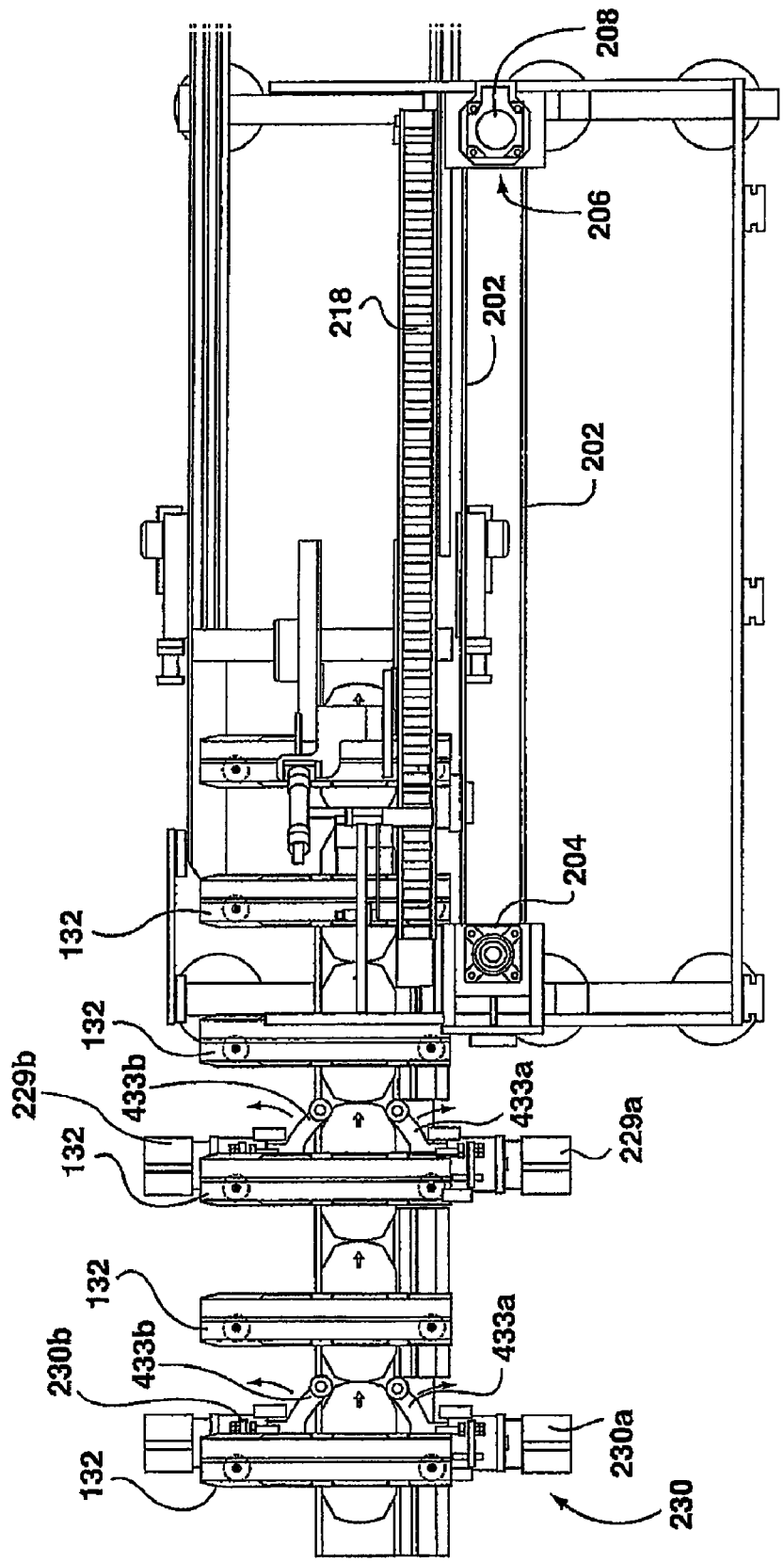
FIG. 7 is a plan view of the part of the system of FIG. 5.
Figure 8A:
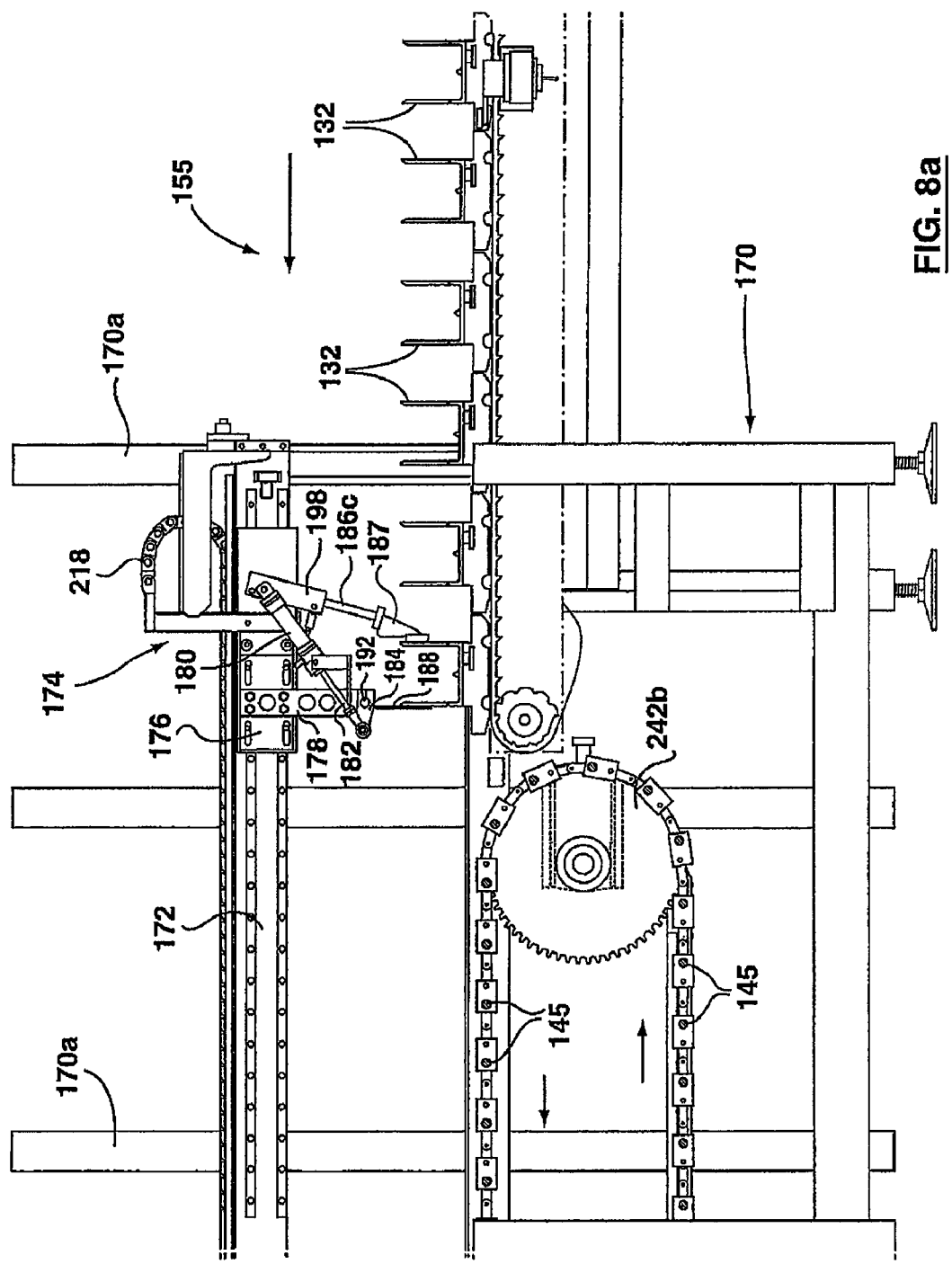
FIGS. 8 A-D are sequential, front elevation views of the part of the system of FIG. 5.

Positioned at upstream locations in and from transition station 152 are one or more spaced puck clamping devices designated 230. In the illustrations are shown several clamping or puck restraining devices 229a, 229b; 230a, 230b; 231a, 231b, and 232a, 232b. As shown in FIG. 7, devices 230 have arms 433a, 433b which can engage on opposed surfaces 144e, 144f of pucks 132 (see FIGS. 13 and 14) and so provide forces to oppose the forces created by the pucks 132 as they attempt to move downstream. It will be appreciated that when puck transition apparatus 174 is in a puck blocking/restraining position such as is shown in FIG. 8a, none of pucks 132 in group 155 can move longitudinally downstream on belt 130. The result is that the belt slides under the lower surface of base 144 of each puck. However, this relative movement creates an additional force on the belt 130 in the upstream direction. As more pucks accumulate at station 152, the total friction force continues to accumulate, with each additional puck 132 adding to the total load. To assist transition apparatus 174 in resisting this load imparted by all the accumulated pucks 132, one or more of the plurality of puck clamping devices, 229a, 229b; 230a, 230b; 231a, 231b, and 232a, 232b can be activated to provide resistance forces in an upstream direction at one or more suitable locations. The precise number and location of devices like puck clamping devices, 229a, 229b; 230a, 230b; 231a, 231b, and 232a, 232b can be selected depending upon the particular application. However, providing one or more devices 230 upstream of transition apparatus may ensure that transition apparatus 174 does not, on its own, have to resist the load of all the pucks 132 as they accumulate and are held stationary.

With reference to FIG. 1, an optical sensor 233 can be provided just upstream of any one or more of the puck clamping devices 230, and may detect the presence of a puck 132 for a constant pre-determined period of time on belt 130 proximate that location. This will mean that a pre-determined minimum number of pucks 132 have accumulated and are ready for delivery by the delivery sub-system 111, to puck unloading conveyor 116. PLC 100, upon receiving a signal from such a sensor, may send signals causing all activated clamping devices 230 to release the pucks they are respectively clamping, and thus triggering pucks that have accumulated in a group 155 to start to move downstream. This can occur at approximately the same time as transition apparatus 174 starts to move the lead puck 132 to synchronize the lead puck 132 with puck unloading conveyor 116.

Next, as illustrated in FIG. 1, the features of puck unloading conveyor 116 will be described. Puck unloading conveyor 116 receives pucks 132 at transition station 152 that are supplied by puck in-feed conveyor 112, and which may make the transition with the assistance of puck transition apparatus 174. Pucks 132 become positively engaged in a fixed longitudinal position on puck conveyor 116 which takes the pucks 132 to item transfer and puck unloading station 151 where pucks 132 are unloaded of items 150 and the items are loaded into cartons 117 being carried by carton conveyor 118. The engagement mechanism that fixes the longitudinal position of the pucks 132 relative to conveyor 116 is not simply a frictional engagement. Any force that is applied to the pucks 132 in a longitudinal direction may be resisted by the contact between the surfaces of the walls of puck slots 141a, 141b and the surfaces of rods 145. While the mating surfaces of slots 141a, 141b and rods 145 are curved, other possibilities are possible, so long as the force interaction in a longitudinal direction between the surfaces is not simply a frictional resistance force. If the resistance to longitudinal movement of the puck relative to the conveyor 116 were only due to a frictional engagement, there would not be a sufficient degree of assurance that the puck would remain in a suitable longitudinal position on conveyor 116 to provide for proper loading of the cartons.

Figure 3:
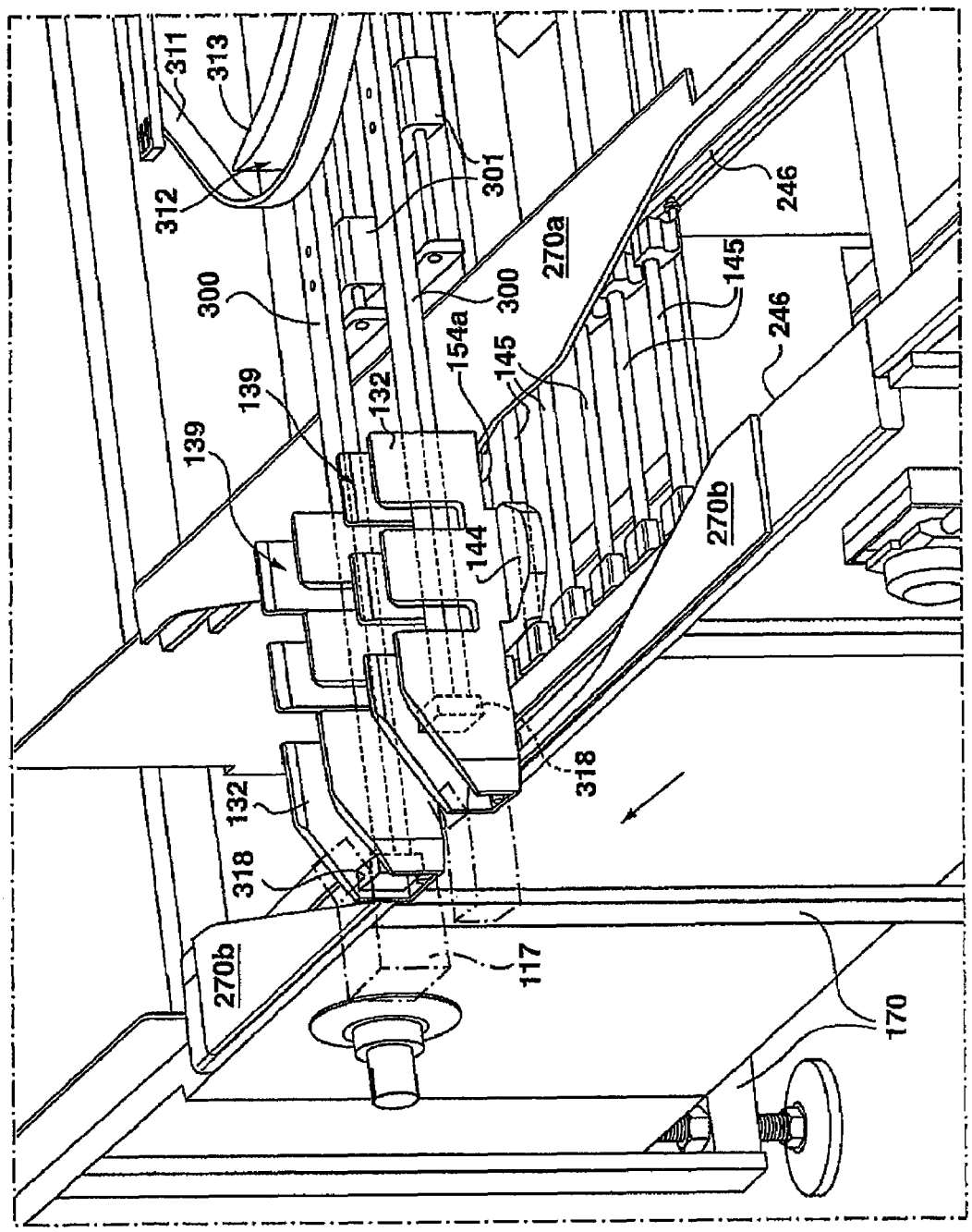
FIG. 3 is an enlarged, rearward directed, right side perspective view of the part of the system in FIG. 1, marked as 3 in FIG. 2.

With particular reference now to FIGS. 2, 5, 9 and 12, conveyor 116 may comprise a pair of endless chains 240a, 240b are supported between idlers 242a, 242b, respectively and drive sprockets 244a, 244b. Chains 240a, 240b may be guided and supported along a chain path by guide rails 246 (FIG. 3). Drive sprockets 244a, 244b may be driven by a common drive shaft 241 (FIG. 2) which is rotated by one or more motors (not shown) which may for example also be AC motors, DC motors or servo motors. Accordingly, drive sprockets 244a, 244b may rotate together to move chains 240a, 240b together in the direction of the arrows shown in the drawings.

The drive sprockets 244a, 244b may drive the chains 240a, 240b at a speed that is less than the speed of belt 130. This will ensure that a back pressure can be provided to ensure that pucks 132 in a group 155 will remain in contact with each other as they transition from puck in-feed conveyor 112 to puck unloading conveyor 116. The rotation of drive sprockets 244a, 244b driven by the servo-motors, can be controlled by PLC 100.

Figure 9:
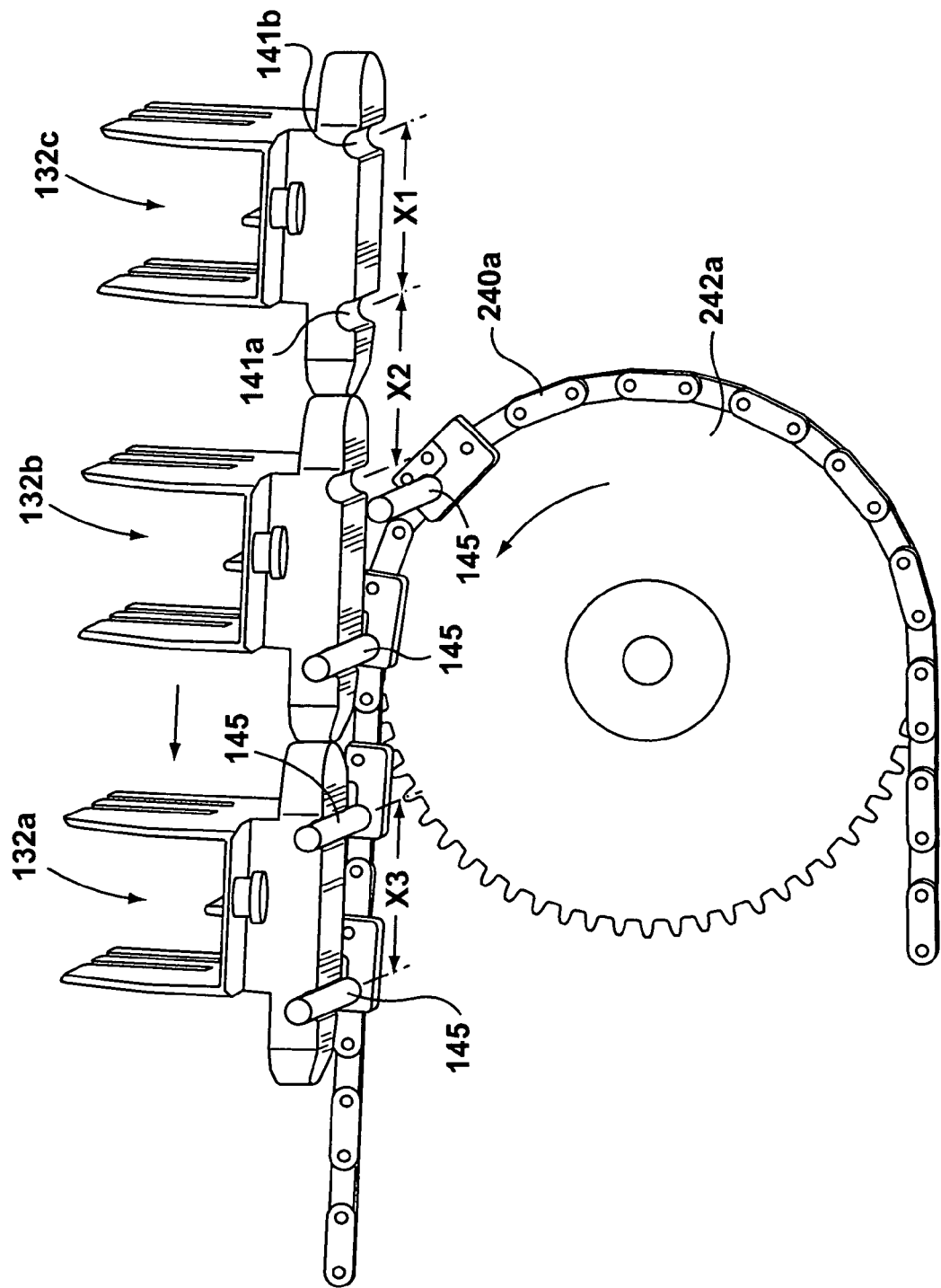
FIG. 9 is a bottom perspective side view showing in isolation part of the puck unloading conveyor of the part of the system of FIG. 5, engaging a plurality of pucks.
Figure 10:
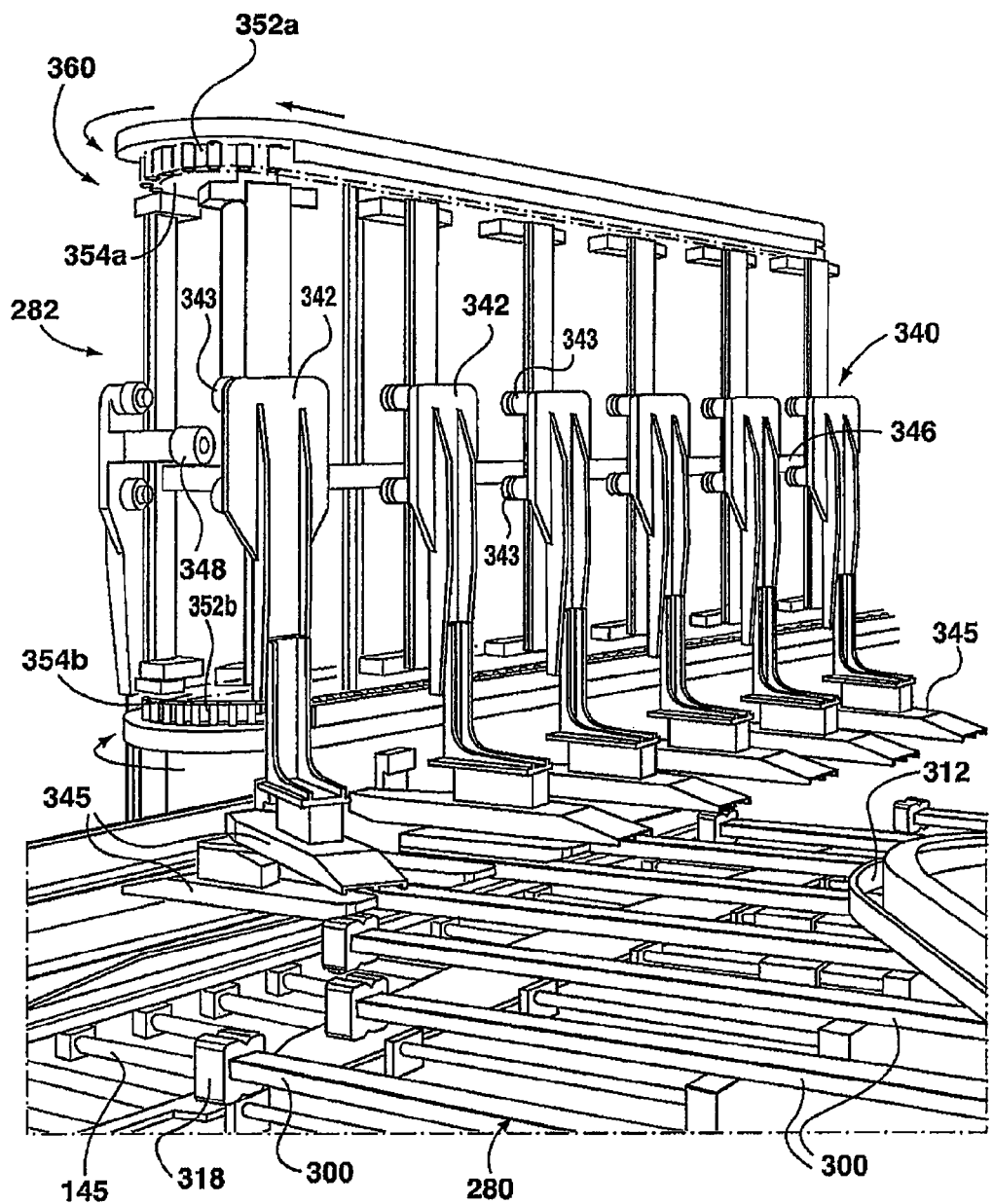
FIG. 10 is a frontward looking front left perspective view of area 2 in FIG. 2 with the product confining apparatus also illustrated.

Suspended between chains 240a, 240b, at a pre-determined pitch X3 (FIG. 9) are transverse rods 145 which are configured to engage slots 141a, 141b on the lower surface of base 144 of each puck 132. As shown in FIG. 9 (where only one side with idler 242a and chain 240a is shown for illustration purposes), the distances X1 and X2 of pucks 132 may be chosen so that the rods 145 will successively and properly engage slots 141a, 141b of successive pucks 132a, 132b, 132c. It will also be appreciated that only some of rods 145 are shown for simplicity in FIG. 9.

It should be noted that the relative position of rods 145 can be known to PLC 100 by use of a resolver associated with drive shaft 241 of conveyor 116. Signals sent by a resolver associated with the rotational position of drive shaft 241 and/or drive sprockets 244a, 244b, to PLC 100, will enable PLC 100 to determine where rods 145 carried by chains 240a, 240b are located at any given time.

PLC 100 may operate so that motor 208 of belt 202 may be a slave to the drive motor of conveyor 116. Thus, PLC 100 may adjust the speed of motor 208 such that the puck transition apparatus 174 can be moved in a manner so that the speed and position of lead puck 132 in the group 155 will be synchronized with the rods 145 carried by conveyor 116 to allow the lead puck to mesh with first and second rods 145.

This may be possible because the positions of at least rods 145 (and possibly belt 202) may be known to PLC 100 by use of the one or more resolvers described above. Thus, the relative positions of puck transition apparatus 174 (and thus of a lead puck 132 of a group 155), and of rods 145 on conveyor 116, may be known to PLC 100. PLC 100 can then adjust the speed of the servo-motor 208 driving belt 202 to achieve synchronization of the lead puck 132 in the group.

Figure 12:
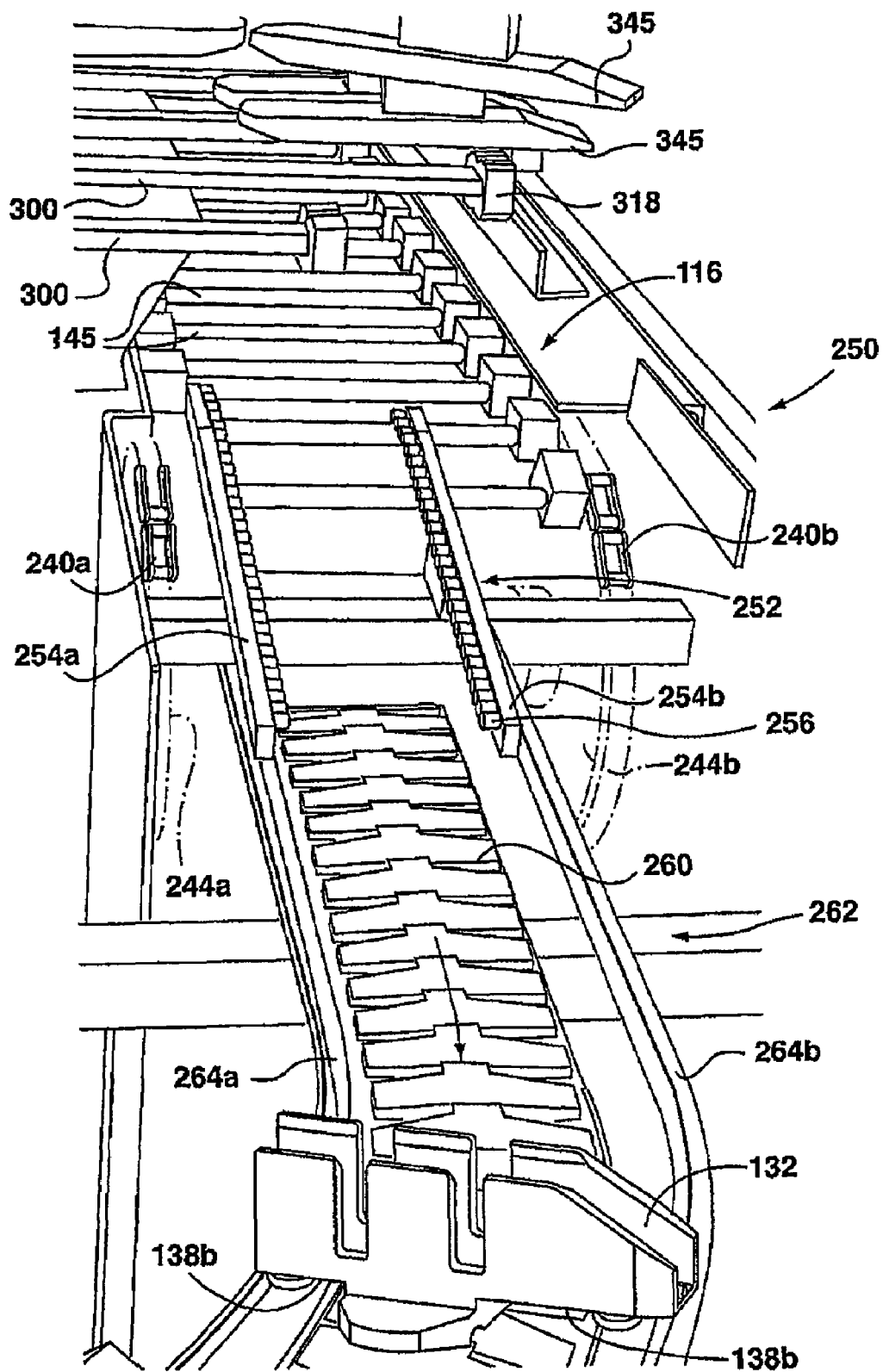
FIG. 12 is a top perspective view in the direction of arrow 12 in FIG. 1.

With reference to FIG. 12, the discharge end 250 of conveyor 116 is illustrated and may include a discharge ramp 252 oriented generally downwards. Ramp 252 may have rails 254a, 254b, and may also be provided with rollers 256 which may engage the underneath surface 138b of pucks 132 to enable pucks 132 to discharge from conveyor 116 onto a puck out-feed conveyor 262. Out-feed conveyor 262 may thus carry discharged pucks 132 away for further processing which may include being re-filled with items 150 and being cycled back to puck in-feed conveyor 112. Out-feed conveyor 262 may be constructed in a manner similar to in-feed conveyor 112 and have a belt 260 driven by drive sprockets interconnected to a drive motor. Out-feed conveyor may also have guide rails 264a, 264b like rails 134a, 134b referenced above. Out-feed conveyor 262 may also be controlled by PLC 100.

While ramp 252 with rails 254a, 254b and rollers 256, uses gravity and the forward momentum of the pucks 132, to assist with discharging the pucks 132 from conveyor 116, any other suitable discharge apparatus or mechanism can be employed. For example, an intermediate bridge conveyor or a transition apparatus that may be constructed similar to transition apparatus 174 that will engage each puck 132 and push it over a pair of rails onto belt 260.

Figure 4:
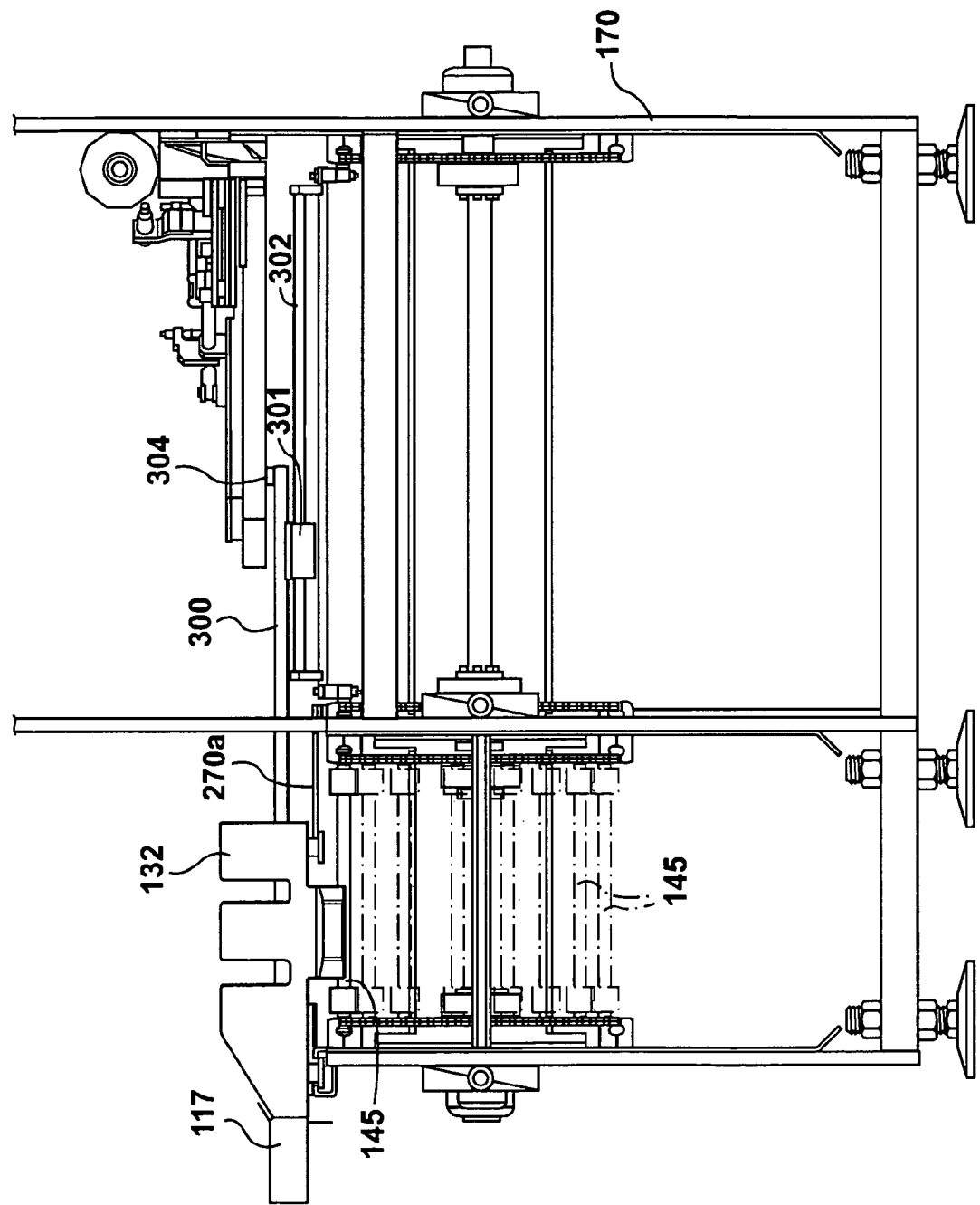
FIG. 4 is a cross sectional view at 4-4 in FIG. 2.

With particular reference to FIGS. 2, 3 and 4, mounted on frame 170, above conveyor guide rails 246 on conveyor 116, are cam plates 270a and 270b. The cam plates 270a, 270b are configured to co-operate with cam followers 154a, 154b respectively of pucks 132. As will be evident from FIG. 4, cam plates 270a, 270b engage the cam followers 154a, 154b above and in the slot provided between flanges 156a, 156b respectively and corresponding lower surfaces 138b of the pucks. Thus flanges 156a, 156b may assist in maintaining the pucks 132 in firm engagement with the rods 145 of conveyor 116. This may be of particular importance during the item unloading process, to ensure that the pucks 132 remain in a proper unloading position relative to cartons 117.

As can be appreciated from FIGS. 2 and 3, as pucks 132 are driven by rods 145 along the path of conveyor 116, the cam plates 270a, 270b will engage the cam followers 154a, 154b respectively to slide the pucks 132 transversely on rods 145. At item transfer station 120, pucks 132 can be brought transversely toward carton conveyor 118 so that pucks 132 can be positioned transversely adjacent to and longitudinally aligned with cartons 117 being carried on the carton conveyor 116 to permit unloading of items 150 from pucks 132 into cartons 117. As shown, cam plates 270a, 270b may also be configured to slide the pucks 132 away from the carton conveyor 118 once the item unloading from the pucks 132 has been completed.

With reference now to FIGS. 2, 3, 4 and 10, the item transfer apparatus generally designated 120 facilitates the transfer of items 150 from pucks 132 into the cartons 117. Item transfer apparatus 120 may include a transverse item pushing apparatus 280 and a vertical confining apparatus 282 (for simplicity the latter is not shown in FIGS. 2, 3 and 4).

Figure 16:
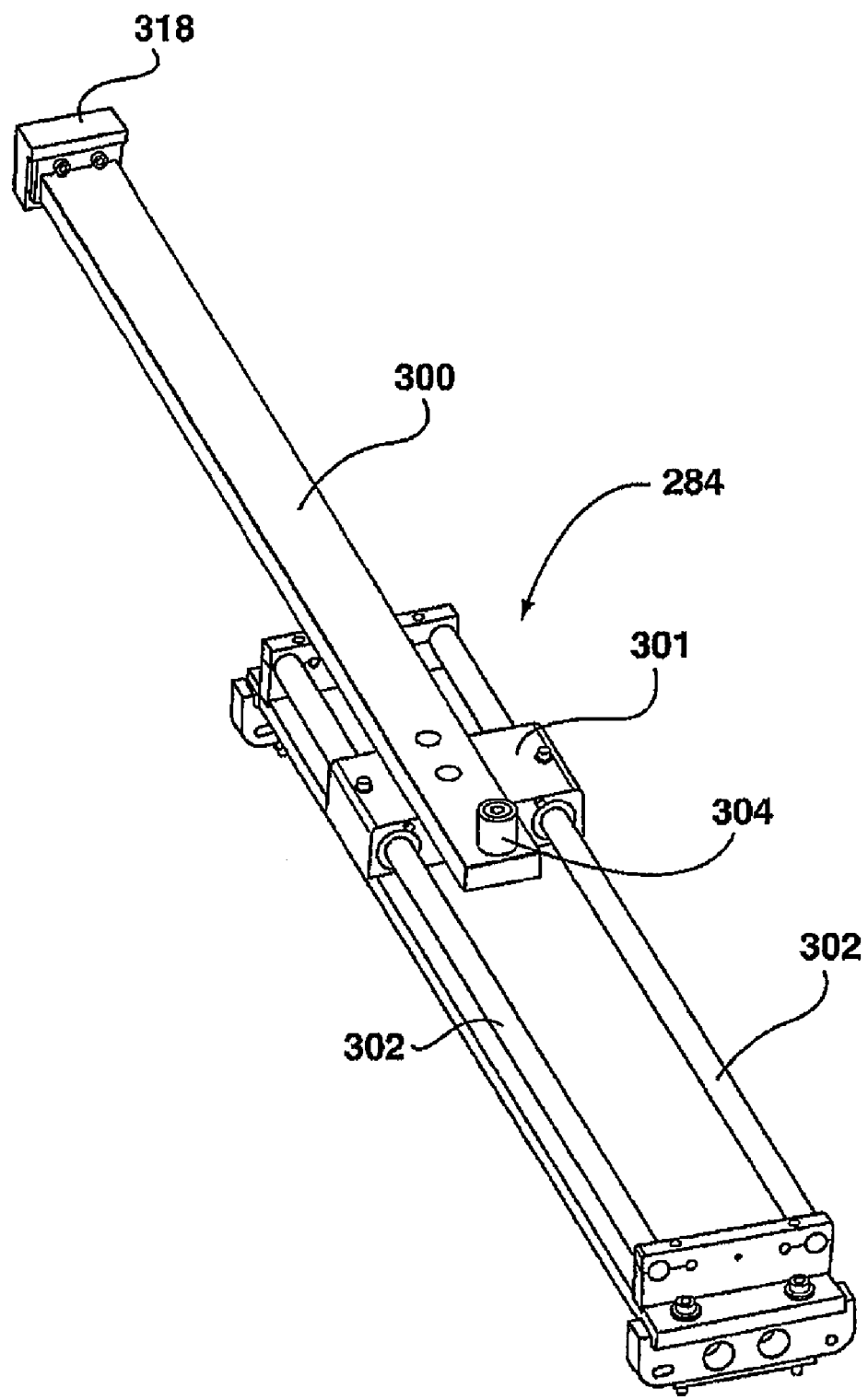
FIG. 16 is a perspective view of a pusher assembly that is part of the system of FIG. 1.

With reference also to FIG. 16, pushing apparatus 280 may include a plurality of pusher assemblies 284. Pusher assemblies 284 may include a pusher bar 300 mounted with a slide block 301 to, and able to slide backwards and forwards on, slide bars 302.

Pusher bars 300 may have extending upwards a cam follower 304 for engaging a cam track 312. Pusher assemblies 284 also include mounting blocks 306a, 306b which enable the pusher assemblies to be mounted and supported on a pair of endless conveyor chains (not shown) which rotate about idler sprockets 296a, 296b and drive sprockets 294a, 294b. Drive sprockets 294a, 294b may be mounted on a drive shaft 298 which may be an extension of drive shaft 241 of the puck unloading conveyor 116. If drive sprockets 294a, 294b and idler sprockets 296a, 296b of the pusher assembly conveyor 286 are the same diameter as the drive sprockets 244a, 244b and idler sprockets 242a, 242b, of puck unloading conveyor 116, pusher assemblies 284 may move at the same speed as the pucks 132. By ensuring that the two conveyors 116 and 286 are synchronized in both position and speed, the pusher assemblies 284 can be positioned so that the pusher bars 300 may move the pusher heads 318 into the item receptacles 139 of the pucks 132 to dislodge one or more items 150 held therein.

PLC 100 can thus control the movement of both the puck unloading conveyor 116 and the pusher conveyor 286 by controlling the operation of the common drive motor(s).

Figure 11:
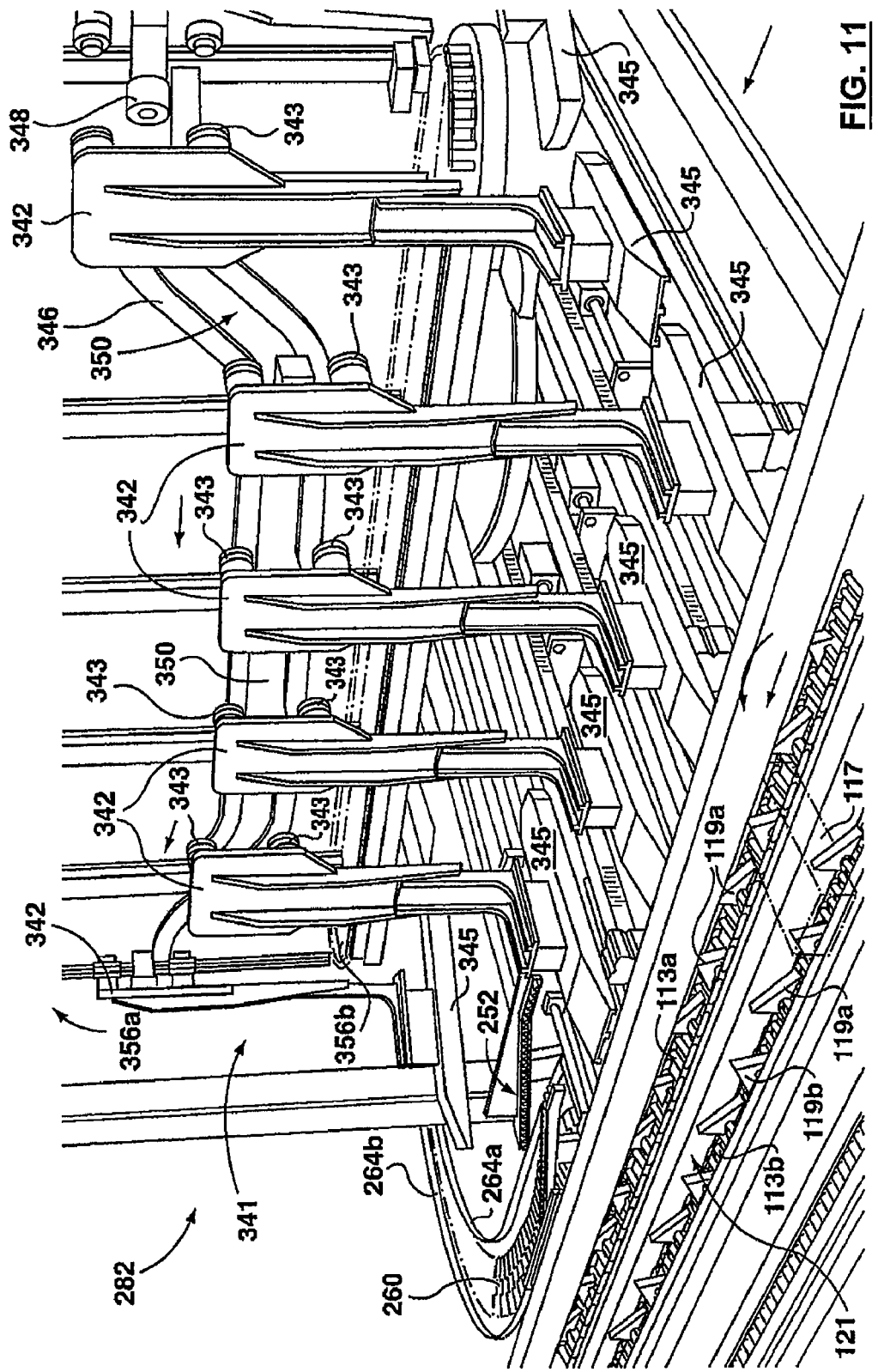
FIG. 11 is a frontward looking rear left perspective view of the same area as illustrated in FIG. 10.

As pusher assemblies 284 move around the path of pusher conveyor 286, cam followers 304 will, during normal operation, enter an entrance 312a of pusher cam track 312 (path A). This will move the cam follower 304 of each pusher assembly such that the pusher arm 300 will move transversely such that the pusher head 318 of each pusher assembly 284 will enter a respective receptacle 139 of a puck 132. This may push an item or items 150 out of the receptacle 139 and into a carton carried in a slot 121 (see FIG. 11) on carton conveyor 118.

Figure 17:
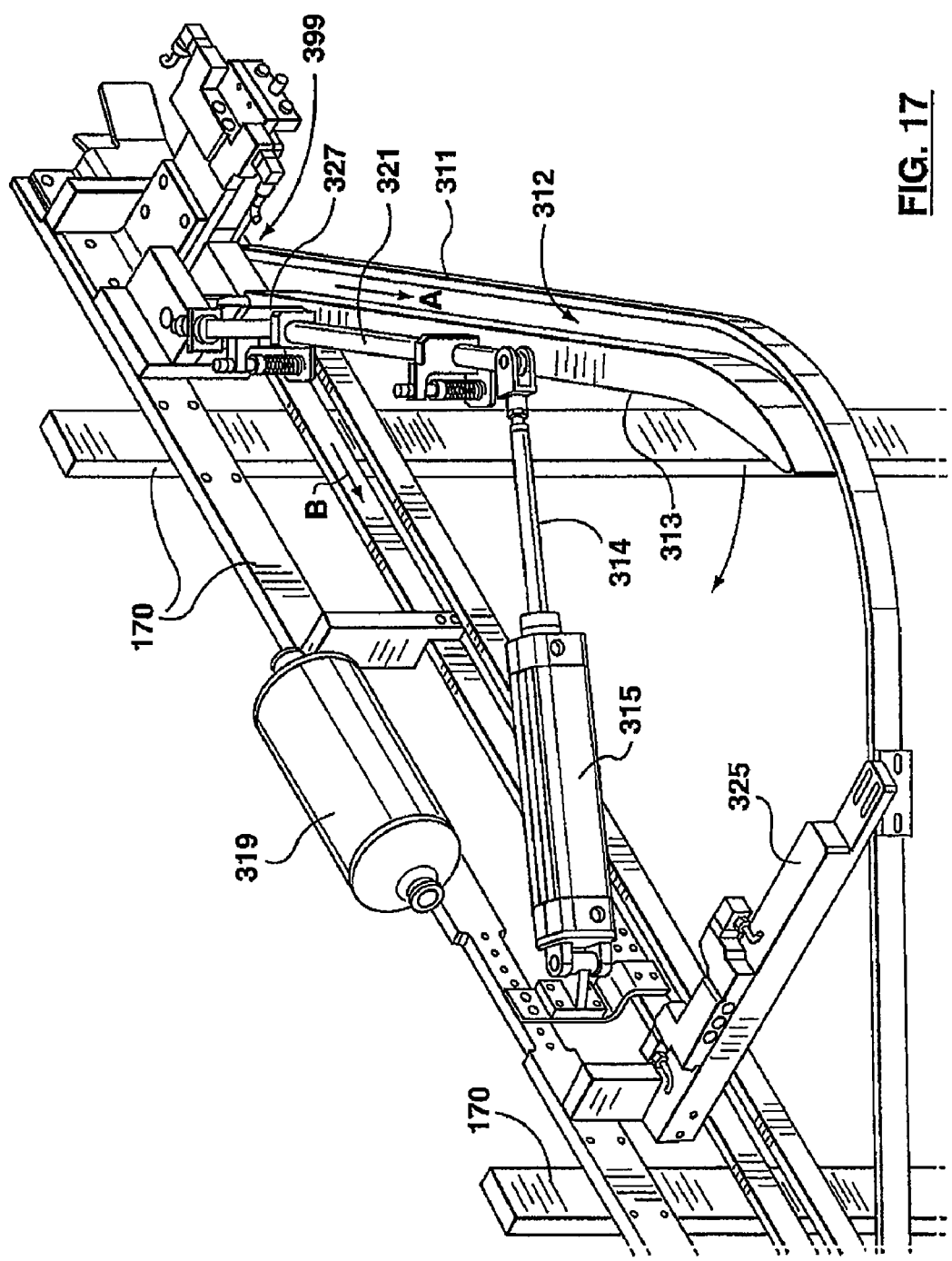
FIG. 17 is an enlarged view of part of the system at 17 in FIG. 2.

With reference now to FIG. 17, cam track 312 is defined by an outer rail 311 and an inner rail 313. A brace member 325 may be provided to support outer rail 311. The end of a piston arm 314 of a double acting cylinder 315 is affixed to an end of a rod 321. Rod 321 has its opposite end interconnected to a pivot bracket 327. Rail 311 is connected to inner rail 313. The extension and retraction of piston arm 314 will cause rail 313 to move inwards or outwards. The position of rail 313 shown in FIGS. 1 and 17 is the most outwardly rotational position of the rail. Rail 313 may be rotated inwards when a problem is detected in system 110 and it is not desired that cam followers 304 mounted on one or more pusher bars 300 should follow the cam track path A to cause the pusher arm to be maintained in the extended positions imposed by path A extended. This may be part of the system overload feature. If a problem is detected by a sensor, PLC 100 can cause cylinder 315 to be retracted thus releasing any outward transverse load on any pusher arms 300 travelling in track 312 that might arise.

Another system feature that can deal with problems in the carton conveyor 118 may include an optical sensor appropriately positioned relative to carton conveyor 118. This optical sensor may detect when a carton 117 is not in the correct position in a slot 121 on carton conveyor 116 and thus no carton is ready to receive an item 150. In such circumstance, the sensor sends a signal to PLC 100, which in turn causes a switch 399 (FIG. 17) to operate to direct the cam follower 304 on the corresponding pusher bar 300 to be directed instead down path B. The result is that for that particular pusher bar 300 that would engage a puck 132 aligned with a carton slot 121 that does not have a carton 117, the cam follower 304 does not follow the cam track 312 on path A, but instead follows the track of path B, and so an item 150 is not discharged from the appropriate puck 132 into the unfilled carton slot 121. A reserve tank of compressed air 319 may be provided to supply primary or reserve compressed air, to activate cylinder 315 and/or switch 399 with a very quick response time (which may be necessary in the event that a fault is identified in the operation of the system as just described).

Vertical confining apparatus 282 may be constructed in a manner that is quite similar to item pushing apparatus 280, but with the conveyor being oriented generally about vertical axes as opposed to horizontal axes. Apparatus 282 may comprise a plurality of confining members 340 that are part of confining member conveyor 360. Conveyor 360 includes conveyor chains 352a, 352b that are supported and guided along a conveyor path. Chains 352a, 352b are driven about idler sprockets 354a, 354b to rotate the confining members 340 around the conveyor path. Confining members 340 may include arms 342 which have mounted thereto at a distal end, a confining block 345. Confining block 345 is configured to be positioned above and may slide into the top of a receptacle 139 between receptacle walls 136a, 136b.

Arms 342 have rollers 343 that may engage rails or slots in slider bars 346, thus allowing arms 342 to move reciprocally up and down on slider bars 346. Arms 342 may also have depending therefrom, a cam follower 348 which can be received in a cam track 350 on a side 341 of conveyor 360. When cam followers 348 follow cam track 350, arms 342 move so as to confine items held in receptacles 139 of pucks 132 so that items 150 may not be displaced vertically upwards out of the receptacle but are guided into cartons 117 when pusher bars 300 move transversely through receptacles 139.

Drive sprockets 356a, 356b, may be mounted on a common drive shaft (not shown) and driven by suitable motors at the same speed as pusher conveyor 286 and puck unloading conveyor 116.

With reference to FIG. 1, another component of system 110 is carton conveyor 118 that moves cartons 117 along a path at item transfer station 151 that is adjacent to pucks 132 carried on puck unloading conveyor 116. Cartons 117 on carton conveyor 118 move in the same longitudinal direction as pucks 132 at station 151. A carton magazine 122 may be provided upstream of the carton conveyor 118 to store a plurality of cartons. A carton feeder 124 is operable to remove cartons 117 from magazine 122 and place them between flights 119a, 119b mounted on conveyer chains 113a, 113b respectively into slots designated 121. Examples of carton feeding systems that might be employed are disclosed in U.S. Pat. Nos. 7,081,079 and 5,997,458 owned by Langen Packaging Inc., the entire contents of which are hereby incorporated herein by reference.

The position of flights 119a, 119b and thus the position of carton 117 held in slots 121, are such that the opening to each carton will be aligned with an adjacent opening of a receptacle 139 of pucks 132 when the pucks and the cartons move longitudinally through the item transfer station 151.

In operation, PLC 100 may in starting up system 110, activate the drive motors to start the movement of carton conveyor 118, puck unloading conveyor 116 along with pusher conveyor 286, and confining member conveyor 360. PLC 100 may also start up out-feed conveyor 262. These components may then be in a normal operating state, where the position of rods 145 on puck unloading conveyor, flights 119a, 119b on carton conveyor 118, pusher assemblies 284 on pusher conveyor 286 and confining members 340 on confining conveyor 360 are all synchronized so that: (a) pucks 132 may be aligned with cartons 117 held in slots 121; (b) pusher bars 300 may be received into receptacles 139 of adjacent pucks 132; and (c) confining blocks 345 may be suitably positioned above or in an upper portion of receptacle 139 so as to vertically confine items 150 held in receptacles 139 during unloading of the items 150 from pucks 132.

Thus, with system 110 in an operational mode as just described, pucks 132 carried on puck in-feed conveyor 112 and already loaded with one or more items 150 may be fed to transition station 152. Pucks may be accumulated upstream from station 152 and clamping devices 230 may assist transition apparatus 174 in holding up the downstream pressure that accumulates as more and more pucks 132 arrive. The lead puck in the group may be held at a stationary "holding" position as shown in FIG. 8a, by paddle 188 and rear panel engagement member 187. Once a sensor such as a sensor 233 (FIG. 1) detects that the minimum number of pucks have accumulated to form a group for delivery, PLC 100 can cause the lead puck of the group 155 to be moved by transition apparatus 174 and clamping devices 230 to release upstream pucks.

Figure 8B:
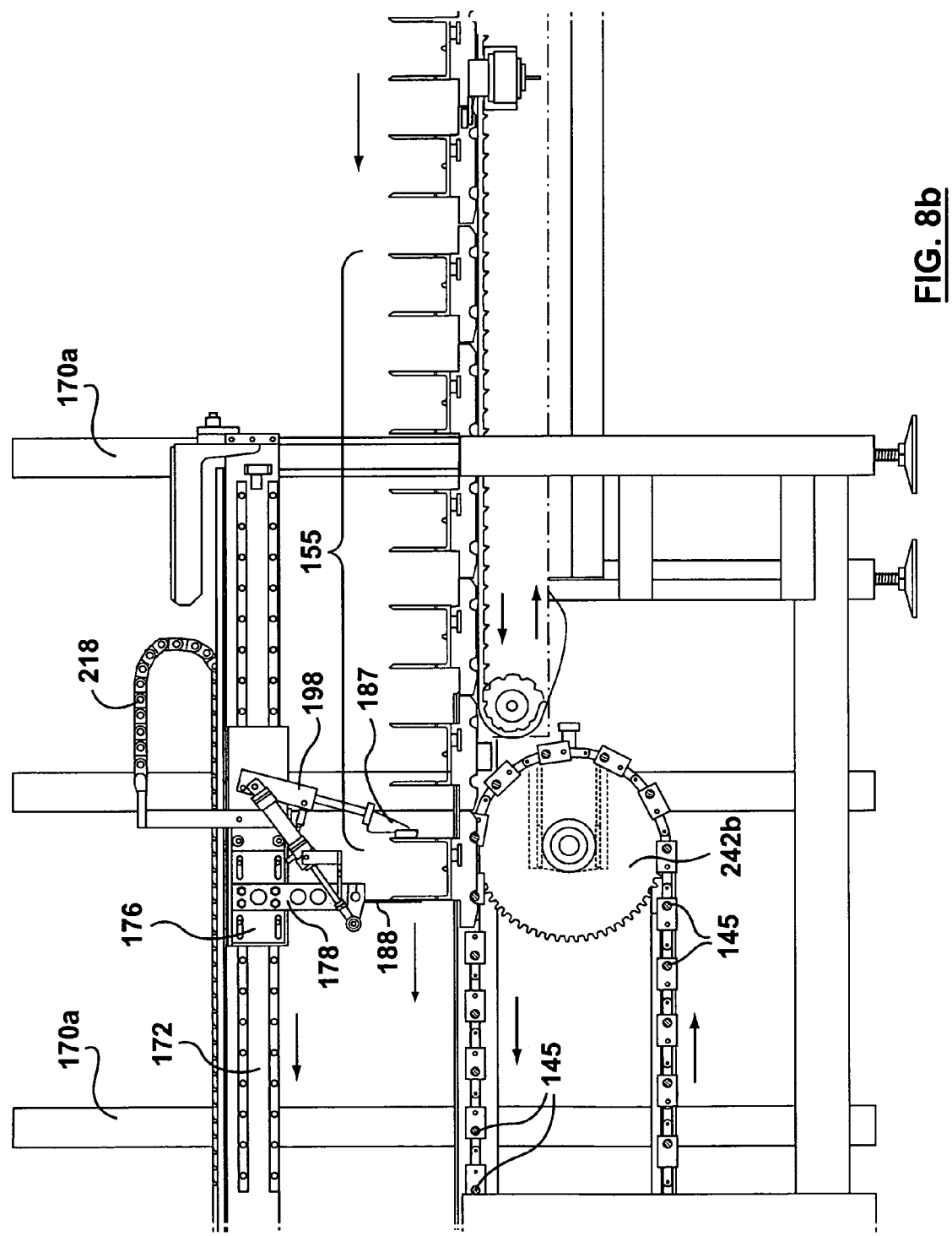

In response to PLC 100 receiving information or signal indicating that the minimum desired number of pucks 132 are at station 152, PLC 100 may then operate servo-drive motor 208. PLC 100 may operate such that the motor 208 of belt 202 will be a slave to the servo-drive motor of conveyor 116. Thus, PLC 100 may move the lead puck 132 in group 155 and in doing so adjust the speed of motor 208. Accordingly, paddle 188 and engaging member 187, which are interconnected to belt 202, can be moved in such as manner that the speed and position of lead puck 132 in the group of pucks 155 will become synchronized with the rods 145 carried by conveyor 116. Therefore, as the transition apparatus 174 moves from the position shown in FIG. 8a to the position shown in FIG. 8b, the lead puck will pass over rails 444a, 444b and then the front slot 141b of the lead puck will engage a rod 145 followed by rear slot 141a engaging the next rod 145. It may take about 1½ puck lengths for the lead puck to be synchronized with the position of a rod 145 carried on conveyor 116. Rails 444a, 444b, permit the lead pucks longitudinal position to be synchronized with first and second rods 145 prior to actually the slots 141b, 141a of the lead puck attempting to engage the rods 145.

As belt 130 may be continuing to move at a speed at least as fast, if not faster, than the speed of conveyor 116, the pucks 132 following behind the lead puck, may continue to be pushed into abutment with each other forming a continuous group 155 of pucks 132. The transition apparatus 174 may however, control or assist in controlling the speed and position of all the pucks 132 in the group 155 for about another 2 puck lengths until the lead puck reaches the position shown in FIG. 8c. At this position at least the first two pucks in the group, and possibly 2 to 3 lead pucks, may be in a position to and be engaged by rods 145 carried by conveyor 116. At this position, PLC 100 can send one of more signals to cause the pneumatic cylinders associated with paddle 188 and engagement member 187 to be activated. This may cause paddle 188 and rear engagement member 187 to move to the release positions shown in FIG. 8c. Even though a significant downstream force may be exerted on the pucks that have engaged with rods 145 from upstream pucks being pushed by belt 130, the cam followers 154a, 154b with flanges 156a, 156b respectively will hold those lead pucks firmly on the rods 145. This may also ensure that pucks 132 that are just upstream will also remain stable during the transition process.

Once the first two or three pucks in group 155 are engaged with rods 145 of conveyor 116, the remaining pucks 132 of the group 155 will be driven by belt 130 into engagement with corresponding additional rods 145 on the conveyor. The result may be that all pucks 132 in group 155 will be transferred from in-feed conveyor 112 to the puck unloading conveyor 116. Pucks 132 may thereafter continue to accumulate indefinitely so long as pucks 132 are continuing to be supplied by in-feed puck conveyor 112 without gaps between adjacent pucks.

Figure 8C:
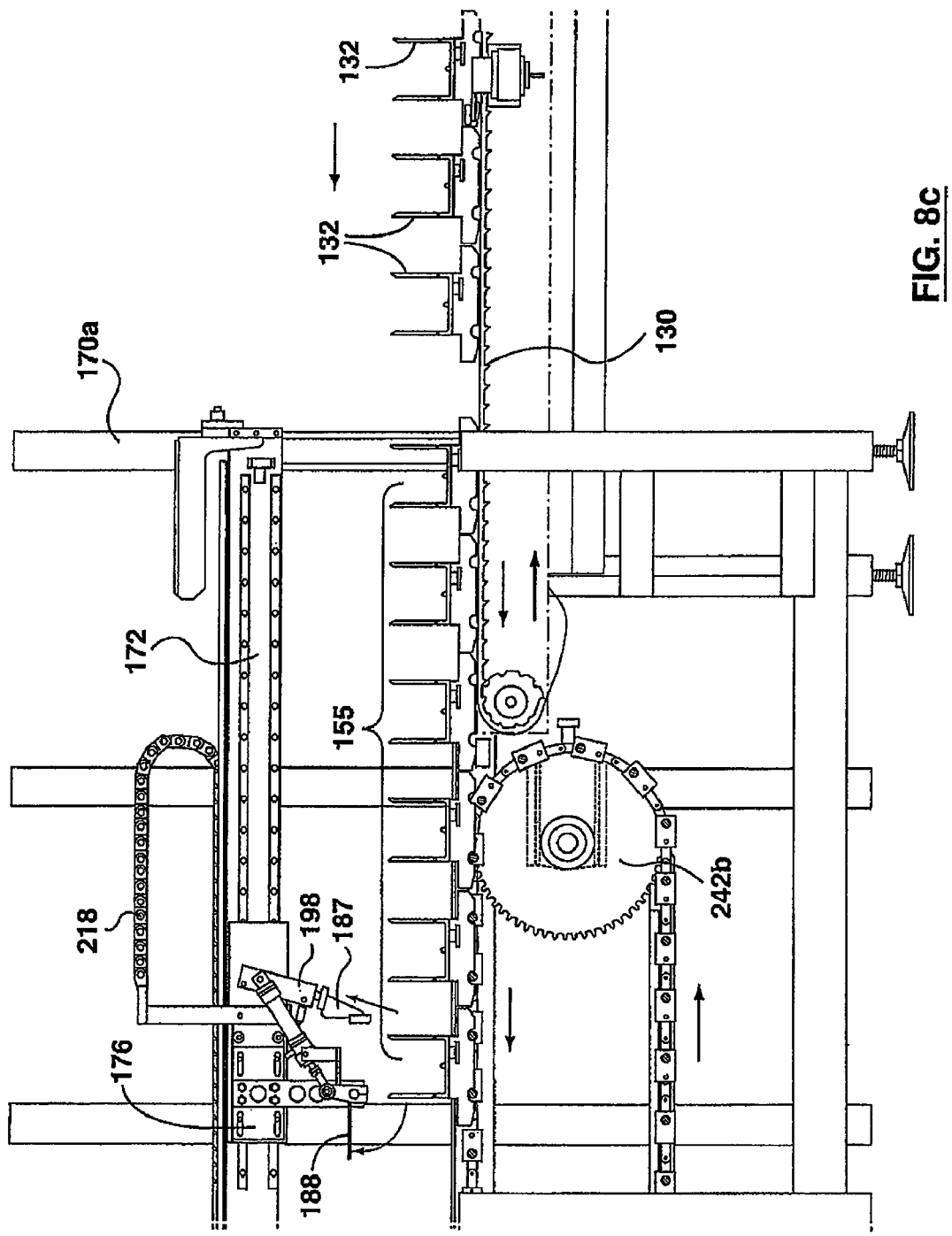

After the transition apparatus 174 has released the lead puck 132 in the group of pucks as shown in FIG. 8c, PLC 100 will cause the transition apparatus 174 to move quickly backwards along track 172 to a hold position (with paddle 188 still pivoted at the horizontal position and member 187 retracted). So long as the optical sensor in the vicinity of station 152 does not detect any gaps between adjacent pucks 132 that have not yet reached rails 444a, 444b (or at least not been engaged by puck unloading conveyor 116, pucks 132 will be continued to be supplied and pushed by belt 130 of in-feed conveyor 112, into engagement with puck unloading conveyor 116. However, if the optical sensor in the vicinity of station 152 detects a gap between adjacent pucks being delivered by in-feed conveyor 112, then PLC 100, including transition apparatus 174 will be activated to terminate the continuation in supply of pucks to the first group 155. If there is a gap between adjacent pucks 132, then pucks may not continue to be delivered in synchronization with rods 145 of conveyor 116. Thus paddle 188 will rotate to the 6 o'clock position and member 187 will be extended, so as to block a puck 132 at or downstream from where the gap was detected, so that there is no discontinuity in the positions of pucks 132 being supplied to puck unloading conveyor 116. It will be appreciated that the gap in pucks 132 should be detected at, or upstream of, where transition apparatus 174 can intervene to interrupt the supply of pucks 132 to conveyor 116.

Figure 8D:
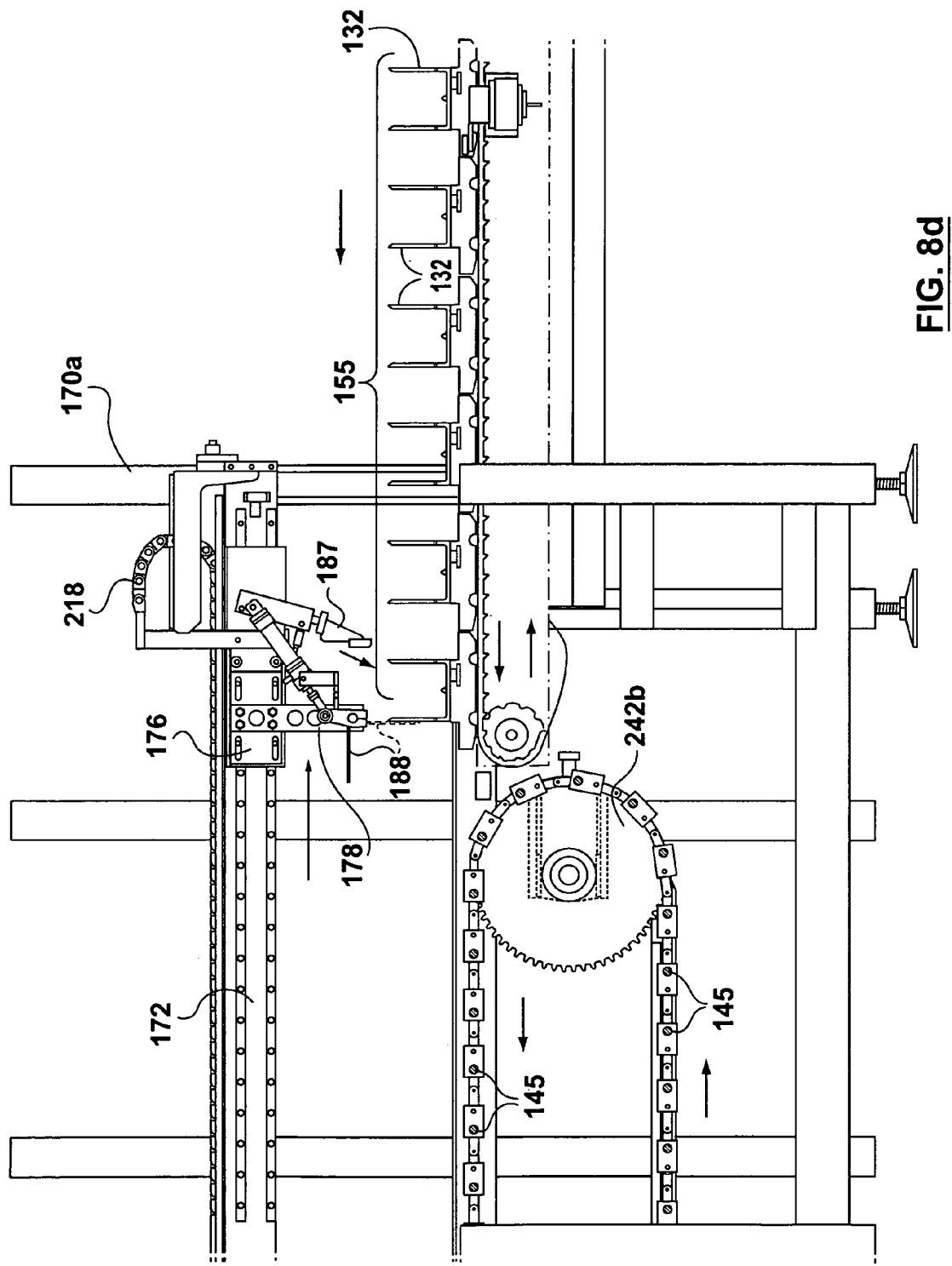

Transition apparatus 174 will thus have located a new lead puck 132 and the next group of pucks 155 will start to be accumulated behind the next lead puck with paddle 188 rotated downwards and member 187 extended. It will be appreciated that to try to ensure that adjacent pucks 132 with gaps there between do not try to engage conveyor 116, the rearward movement of transition apparatus 174 along track 172 to the position shown in FIG. 8d occur at a relatively high speed.

Optical sensors can also be provided both to ensure that each puck 132 that is being carried by in-feed conveyor 112 is filled with an item 150. If no item 150 is detected in a particular puck 132, then a carton 117 may not be delivered by carton feeder 124 to a corresponding slot 121 on the carton conveyor 118.

PLC 100 may be configured to receive a signal from a sensor identifying a puck 132 that is missing an item 150 and then may then not send a carton 117 through in the corresponding slot 121 on carton conveyor 118.

Alternatively, if a carton 117 is not properly delivered into an appropriate slot 121 on carton conveyor 118, this can also be detected by a suitably placed optical sensor which can then cause PLC 100 to have a corresponding pusher bar 300 not engage a corresponding adjacent puck, so as not to push an item into a slot 121 without a properly aligned carton 117. This can be achieved by operation of switch 399 that diverts the cam follower of the corresponding puck 132 down path B instead of path A (i.e. 312) on item transfer apparatus 120.

In normal operation, while transition apparatus 174 is providing for the transfer of pucks 132 to puck unloading conveyor 116, PLC 100 may also send a signal to rotary carton feeder 124 to load an appropriate number of cartons from magazine 122 into appropriate placed successive slots 121 on carton conveyor 118.

Meanwhile, the first group of pucks will be moving along the path of conveyor 116 and will come into adjacent position to cartons 117. Thereafter, as the pucks 132 and cartons 117 are carried through station 151, pusher bars 300 with the assistance of the confining members 340, will push items 150 out of receptacles 139 and into the aligned cartons 117.

Once unloaded of items 150, pucks 132 continue in their path on conveyor 116 until they are discharged onto out-feed conveyor 262. At the same time, loaded cartons 117 may continue on carton conveyor 118 for further processing, in a manner that is known. The further processing of cartons 117 may include sealing of all flaps on the cartons 117.

In other embodiments variations of the components described above can be used. By way of example, instead of a transition apparatus 174 which forms a group of pucks before making a transition of the group onto puck unloading conveyor 116, pucks may be moved to conveyor 116 on an individual basis upon arrival at transition station 152. While the supply of pucks 132 to puck unloading conveyor 116 may be intermittent, this can be accommodated on the carton conveyor side in several ways. For example, an optical sensor might be provided to provide a signal to PLC 100 that a puck 132 is being delivered to conveyor 116. In response to receiving such a signal, PLC 100 may signal carton feeder 124 to feed a carton 117 to carton conveyor 116 in an appropriate slot 121.

Other types of puck transition mechanisms could also be employed. For example, a robot system combined with a vision system could be configured to move pucks loaded with items from an in-feed bucket conveyor onto a puck unloading conveyor Of course, the above described embodiments, are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

The invention claimed is:

1. A system for loading a plurality of items held in a plurality of pucks into a plurality of containers, said system comprising:
   (a) a plurality of pucks, each of said pucks adapted to retain an item;
   (b) a puck delivery sub-system comprising a puck in-feed conveyor operable to move each of said plurality of pucks in series generally in a first longitudinal direction along an in-feed conveyor path portion while each of said plurality of pucks retains at least one item, and a transition apparatus operable to facilitate the transition and transfer of said plurality of pucks while each of said plurality of pucks is retaining said at least one items from said puck in-feed conveyor to a continuous puck unloading conveyor, said continuous puck unloading conveyor being separate from said puck in-feed conveyor and being operable for moving said plurality of pucks generally while each of said plurality of pucks retains said at least one item;
   (c) said continuous puck unloading conveyor operable to move said plurality of pucks in series in a second longitudinal direction along a puck unloading conveyor path portion, said pucks and said puck unloading conveyor having a releasable engagement mechanism operable to facilitate said pucks releasably engaging said puck unloading conveyor, such that when each of said pucks is engaged with said puck unloading conveyor, each of said pucks is fixed in a relative longitudinal position in said second longitudinal direction along said puck unloading conveyor path portion relative to said puck unloading conveyor;
   (d) a continuous container loading conveyor for moving a plurality of containers in series in a third longitudinal direction along a container loading conveyor path portion, said plurality of containers being fixed in relative longitudinal position in said third longitudinal direction along said container loading conveyor path portion relative to said container loading conveyor, and said container loading conveyor moving in said third longitudinal direction along said container loading conveyor path portion that is located proximate said path portion of said puck unloading conveyor;
   (e) an item transfer apparatus for transferring said item from each of said plurality of pucks on said puck unloading conveyor to a corresponding container being moved on said container loading conveyor;

wherein said item transfer apparatus transfers each item retained by said pucks once engaged with said puck unloading conveyor, to a respective container of said container loading conveyor, while said puck unloading conveyor is moving along said puck unloading conveyor path portion and said container loading conveyor is moving along said container loading conveyor path portion;

wherein after each item retained by said puck has been transferred to said container, said releasable engagement mechanism is operable to facilitate said pucks being released from engagement with said puck unloading conveyor.

2. A system as claimed in claim 1 wherein said releasable engagement mechanism for each of said pucks comprises at least one slot oriented generally perpendicular relative to said second longitudinal direction and a rod member also oriented generally perpendicular relative to said second longitudinal direction, said rod member being receivable in said slot, wherein when said rod member is received in said slot, the relative longitudinal position in said second longitudinal direction along said puck unloading conveyor path portion of each of said pucks is fixed.

3. A system as claimed in claim 1 wherein said in-feed conveyor moves said pucks by a frictional force engagement mechanism between said in-feed conveyor and said pucks.

4. A system as claimed in claim 3 wherein said in-feed conveyor has a conveyor belt with a belt surface and each of said pucks has a surface, and wherein said frictional force engagement mechanism is provided between said belt surface and said surface of said pucks.

5. A system as claimed in claim 4 wherein said plurality of pucks comprises a plurality of group of pucks, each of said plurality of pucks having a lead puck, and said transition apparatus is adapted to control the movement of said lead puck in said plurality of pucks so that said releasable engagement mechanism between said lead puck and said puck unloading conveyor is engaged, and whereby when said lead puck is engaged with said puck unloading conveyor, said puck in-feed conveyor pushes the remaining pucks of said group such that said releasable engagement mechanisms between each of said remaining pucks and said puck unloading conveyor are engaged.

6. A system as claimed in claim 1 wherein said container unloading conveyor is a continuous conveyor that moves in synchronization with the movement of said continuous puck unloading conveyor.

7. A system as claimed in claim 1 further comprising:
(a) a PLC; and
(b) a first drive motor for driving the movement of said transition apparatus;
wherein said PLC is operable to control the speed of said first drive motor such that the movement of said pucks can be synchronized with the movement of said puck unloading conveyor, so that said engagement mechanism between each of said pucks and said puck unloading conveyor can be engaged.

8. A system as claimed in claim 7 wherein said PLC is operable to control the movement of said puck unloading conveyor and said PLC adjusts the movement of said transition apparatus so that said engagement mechanism between each of said pucks and said puck unloading conveyor is engaged.

9. A system as claimed in claim 1 wherein said plurality of pucks comprises at least one group of pucks, each of said at least one group of pucks having a lead puck, and said transition apparatus is operable to control the movement of said lead puck in said plurality of pucks so that said releasable engagement mechanism between said lead puck and said puck unloading conveyor is engaged, and wherein when said lead puck is engaged with said puck unloading conveyor, said puck in-feed conveyor pushes the remaining pucks of said group such that said releasable engagement mechanism between each of said remaining pucks and said puck unloading conveyor are engaged.

10. A system as claimed in claim 9 wherein said at least one group of pucks comprises a plurality of groups of said pucks, each of said plurality of pucks having a lead puck.

11. A system as claimed in claim 10 further comprising:
(a) a PLC operable to control the movement of said transition apparatus;
(b) a sensor operable to send a signal to said PLC indicative of a minimum number of pucks being available to form a group and for delivery to said puck unloading conveyor;
wherein upon receipt of said signal, said PLC is operable to control said transition apparatus such that the movement of said pucks is synchronized with the movement of said puck unloading conveyor, so that said engagement mechanism between each of said pucks and said puck unloading conveyor is engaged.

12. A system as claimed in claim 9 wherein said in-feed conveyor moves at a speed greater than or equal to said puck unloading conveyor.

13. A system as claimed in claim 12 wherein each of said plurality of pucks in said group of said pucks remains in abutment with adjacent pucks of said group during the transition and transfer from said in-feed conveyor to said puck unloading conveyor at least until engagement with said puck unloading conveyor.

14. A system as claimed in claim 1 further comprising:
(a) a PLC operable to control the movement of said transition apparatus;
(b) a sensor operable to send a signal to said PLC indicative of a minimum number of pucks being available for delivery to said puck unloading conveyor;
wherein upon receipt of said signal, said PLC is operable to control said transition apparatus such that the movement of said pucks is synchronized with the movement of said puck unloading conveyor, and so that said engagement mechanism between each of said pucks and said puck unloading conveyor is engaged.

15. A system as claimed in claim 1 wherein said continuous puck unloading conveyor moves said pucks through application of a positive force on said pucks created by abutment between a first member of said puck unloading conveyor and a second member of each of said pucks.

16. A system as claimed in claim 15 wherein said first member and said second member co-operate to provide a releasable engagement mechanism.

17. A system for loading items into a plurality of containers comprising:
(a) a first puck conveyor for moving a plurality of pucks, each of said pucks retaining an item, along a first path with a frictional force exerted on said pucks by said first puck conveyor, each of said pucks being capable of varying its respective position in relation to the remaining pucks on said first puck conveyor upon application of an opposing force that is greater than said frictional force exerted on each of said pucks;
(b) a second continuous puck conveyor for moving said plurality of pucks along a second path in series while each of said pucks is in a fixed position on said second continuous puck conveyor and each of said pucks when moved by said second continuous puck conveyor being restrained from movement in a direction of movement of said second continuous puck conveyor relative to said second continuous puck conveyor;
(c) an apparatus for facilitating the transition and transfer of each of said plurality of pucks from said first puck conveyor to said second continuous puck conveyor, said apparatus being operable to accumulate said plurality of pucks to form a plurality of groups of said pucks for transition and transfer from said first puck conveyor to said second continuous puck conveyor, said transition apparatus being operable to form a first group of pucks for said transition and transfer to said second continuous puck conveyor, then terminate said accumulation of said first group of said pucks and subsequently accumulate said plurality of pucks to form a second group of said pucks for said transition and transfer to said second continuous puck conveyor;
(d) a container conveyor moving a plurality of containers in series with fixed longitudinal positions in the direction of the movement of said container conveyor along a third path;
(e) an item transfer apparatus for transferring each of said items from each of said plurality of pucks on said second continuous puck conveyor to a corresponding container being moved on said container conveyor;

said second continuous puck conveyor having a path portion of said second path proximate a path portion of said third path of said container conveyor, and wherein the movement of said continuous puck conveyor along said path portion of said second path and the pucks carried therewith is synchronized with the movement of the container conveyor along said path portion of said third path and the plurality of containers carried therewith;

wherein said apparatus facilitates the transition and transfer of said plurality of pucks from said first puck conveyor to said second continuous puck conveyor.

18. A system for loading a plurality of items into a plurality of containers from a plurality of pucks, each of said pucks adapted to retain an item, said system comprising:

(a) a puck in-feed conveyor operable to move each of a plurality of pucks in series along a puck in-feed conveyor path while retaining at least one item, said puck in-feed conveyor moving said plurality of pucks with a frictional force imparted on each of said plurality of pucks by said puck in-feed conveyor;

(b) an apparatus operable to facilitate the transition and transfer of said plurality of pucks while retaining at least one item, from said puck in-feed conveyor to engage a continuous puck unloading conveyor, said continuous puck unloading conveyor being separate from said puck in-feed conveyor;

(c) said puck unloading conveyor having continuous movement which is operable to move said pucks in a first longitudinal direction on a puck unloading conveyor path, wherein each of said pucks is fixed in a relative longitudinal position in said first longitudinal direction relative to said continuous puck unloading conveyor;

(d) an apparatus operable to continuously move a plurality of containers in series in a second longitudinal direction along a puck unloading conveyor path, said plurality of containers each being in a fixed longitudinal position relative to said puck unloading conveyor along said puck unloading conveyor path, and with a portion of said puck unloading conveyor path being positioned adjacent to a portion of said puck unloading conveyor path;

(e) an apparatus for transferring each said item from each of said plurality of pucks on said puck unloading conveyor to a corresponding container while said apparatus moves said pucks on said continuous puck unloading conveyor.

19. A system as claimed in claim 18 wherein:

said a puck in-feed conveyor is operable to move each of said plurality of pucks in series along an in-feed conveyor path portion of said puck in-feed conveyor path;

said second continuous puck conveyor comprises a continuous puck unloading conveyor;

said apparatus for facilitating the transition comprises a transition apparatus operable to facilitate the transition of said plurality of pucks from said puck in-feed conveyor to said continuous puck unloading conveyor;

said pucks and said continuous puck unloading conveyor having a releasable engagement mechanism operable to facilitate said pucks releasably engaging said continuous puck unloading conveyor, such that when each of said pucks is engaged with said continuous puck unloading conveyor, each of said pucks is fixed in a relative longitudinal position extending in said first longitudinal direction relative to said continuous puck unloading conveyor;

wherein said item transfer apparatus transfers each item retained by each of said plurality of pucks once engaged with said puck unloading conveyor, to a respective container of said container conveyor, while said puck unloading conveyor is moving along said puck unloading conveyor path and said container conveyor is moving along said puck unloading conveyor path, wherein after each item retained by said puck has been transferred to a container, said releasable engagement mechanism is operable to facilitate said pucks being released from engagement with said puck unloading conveyor.

20. A system as claimed in claim 18 wherein said first puck conveyor has a conveyor belt with a belt surface and each of said pucks has a surface, and wherein said frictional force is provided between said belt surface and said surface of said pucks.

21. A system for loading a plurality of items into a plurality of containers from a plurality of pucks, each of said pucks adapted to retain an item, said system comprising:

(a) a puck in-feed conveyor operable to move each of a plurality of pucks in series along a puck in-feed conveyor path while retaining at least one item;

(b) a continuous puck unloading conveyor operable to move said pucks along a puck unloading conveyor path, said continuous puck unloading conveyor being a separate conveyor from said puck in-feed conveyor;

(c) an apparatus operable to facilitate the transition and transfer of said plurality of pucks while retaining at least one item, from said puck in-feed conveyor to engage said continuous puck unloading conveyor;

(d) a container loading conveyor operable to continuously move a plurality of containers in series along container conveyor path with a portion of said puck unloading conveyor path being positioned adjacent to a portion of said puck unloading conveyor path;

(e) an apparatus for transferring each said item from each of said plurality of pucks on said puck unloading conveyor to a corresponding container while said puck unloading conveyor moves said pucks on said portion of said continuous puck unloading conveyor and said container loading conveyor moves said plurality of containers along said portion of said container conveyor path.

22. A system for loading items into a plurality of containers comprising:

(a) a first puck conveyor for moving a plurality of pucks, each of said pucks retaining an item, along a first path with a frictional force exerted on said pucks by said first puck conveyor, each of said pucks being capable of varying its respective position in relation to the remaining pucks on said first puck conveyor upon application of an opposing force that is greater than said frictional force exerted on each of said pucks;

(b) a second continuous puck conveyor for moving said plurality of pucks along a second path in series while each of said pucks is in a fixed longitudinal position in a longitudinal direction of movement of said second continuous puck conveyor and each of said pucks is restrained from movement in said direction of movement of said second continuous puck conveyor relative to said second continuous puck conveyor;

(c) an apparatus for facilitating the transition and transfer of each of said plurality of pucks from said first puck conveyor to said second continuous puck conveyor, said apparatus also being operable to accumulate a plurality of pucks from said puck in-feed conveyor into a group of said pucks, said group of pucks being transferred as a group from said first puck conveyor to said second continuous puck conveyor;

(d) a container conveyor moving a plurality of containers in series with fixed longitudinal positions in the direction of the movement of said container conveyor along a third path;

(e) an item transfer apparatus for transferring each of said item from each of said plurality of pucks on said second continuous puck conveyor to a corresponding container being moved on said container conveyor;

said second continuous puck conveyor having a path portion of said second path proximate a path portion of said third path of said container conveyor, and wherein the movement of said continuous puck conveyor along said path portion of said second path and the pucks carried therewith is synchronized with the movement of the container conveyor along said path portion of said third path and the plurality of containers carried therewith;

wherein said apparatus facilitates the transition and transfer of said plurality of pucks from said first puck conveyor to said second continuous puck conveyor.

* * * * *

UNITED STATES PATENT AND TRADEMARK OFFICE
CERTIFICATE OF CORRECTION

PATENT NO.        : 7,726,096 B2
APPLICATION NO.   : 12/232546
DATED             : June 1, 2010
INVENTOR(S)       : Peter Guttinger et al.

It is certified that error appears in the above-identified patent and that said Letters Patent is hereby corrected as shown below:

Column 16
Claim 1, line 8, replace "said at least one items" with -- said at least one item, --

Signed and Sealed this

Twenty-eighth Day of September, 2010

David J. Kappos
*Director of the United States Patent and Trademark Office*